(12) United States Patent
So et al.

(10) Patent No.: US 8,810,538 B2
(45) Date of Patent: Aug. 19, 2014

(54) MOBILE TERMINAL

(75) Inventors: Sunsang So, Seoul (KR); Changhoon Lee, Seoul (KR); Jieun Kim, Seoul (KR); Jaeyoung Choi, Seoul (KR); Sungho Woo, Seoul (KR)

(73) Assignee: LG Electronics Inc., Seoul (KR)

( * ) Notice: Subject to any disclaimer, the term of this patent is extended or adjusted under 35 U.S.C. 154(b) by 210 days.

(21) Appl. No.: 13/422,948

(22) Filed: Mar. 16, 2012

(65) Prior Publication Data

US 2013/0016048 A1 Jan. 17, 2013

(30) Foreign Application Priority Data

Jul. 15, 2011 (KR) ........................ 10-2011-0070274

(51) Int. Cl.
*G06F 3/041* (2006.01)

(52) U.S. Cl.
USPC ......................................................... 345/173

(58) Field of Classification Search
CPC ....................................................... G06F 3/041
USPC ....................................................... 345/173
See application file for complete search history.

(56) References Cited

U.S. PATENT DOCUMENTS

| | | | | | |
|---|---|---|---|---|---|
| 5,467,395 | A | * | 11/1995 | Izumi | 379/399.02 |
| 5,596,641 | A | * | 1/1997 | Ohashi et al. | 380/248 |
| 6,052,200 | A | * | 4/2000 | Mitani | 358/1.16 |
| 7,023,991 | B1 | * | 4/2006 | Nakamura et al. | 380/37 |
| 7,280,763 | B2 | * | 10/2007 | Yamaguchi et al. | 398/94 |
| 7,751,071 | B2 | * | 7/2010 | Namizuka | 358/1.13 |
| 7,940,336 | B2 | * | 5/2011 | Takatori | 348/725 |
| 8,493,919 | B2 | * | 7/2013 | Leung | 370/329 |
| 2006/0123043 | A1 | * | 6/2006 | Kwon | 707/102 |
| 2009/0235242 | A1 | * | 9/2009 | Kawaguchi | 717/168 |
| 2010/0153744 | A1 | * | 6/2010 | Nobukata | 713/189 |
| 2011/0067026 | A1 | * | 3/2011 | Nishio | 718/100 |
| 2011/0181788 | A1 | * | 7/2011 | Takatori | 348/725 |

* cited by examiner

*Primary Examiner* — Fred Tzeng
(74) *Attorney, Agent, or Firm* — Lee, Hong, Degerman, Kang & Waimey

(57) ABSTRACT

A mobile terminal is provided which may include a touch screen for displaying an execution screen of a specific application, a communication unit for establishing a communication network with a display device, and a controller configured to output a result of an execution of the specific application via the display device when an output extension function is activated. When the output extension function is activated, the controller may deactivate a specific function previously set on the touch screen that is related to the specific application and set the touch screen as an input means including one or more control regions, each control region corresponding to a specific function of a specific application.

25 Claims, 46 Drawing Sheets

(a)

(b)

(a)  (b)

FIG. 15
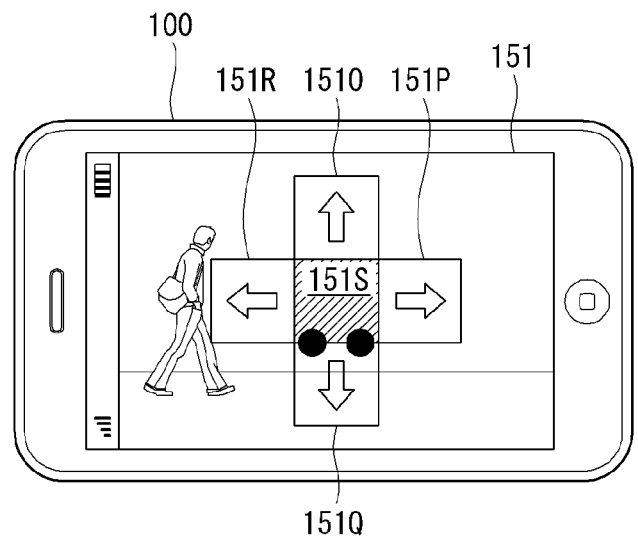
(a)
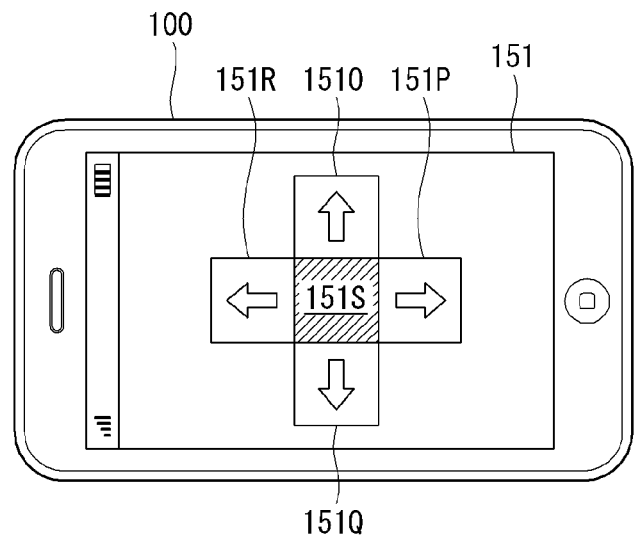
(b)

Receive touch while executing
an image view application
(a)

(b)

FIG. 25
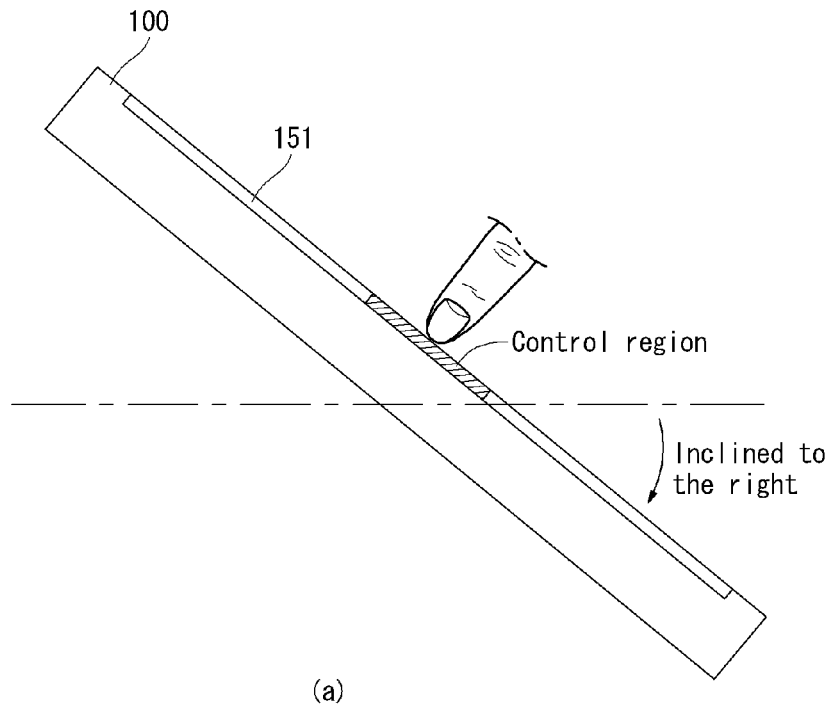
(a)
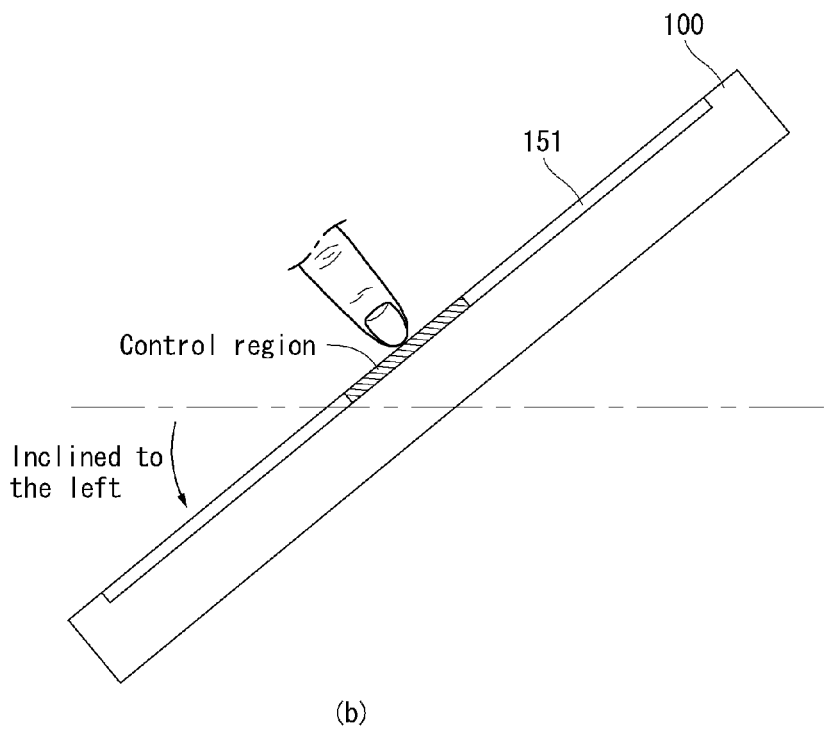
(b)

FIG. 27
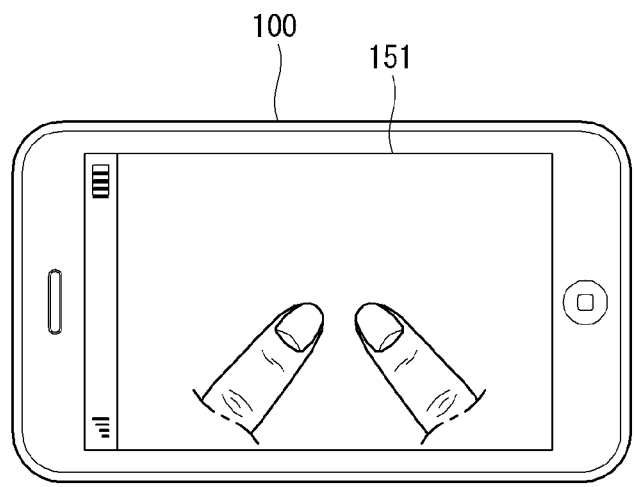
(a)
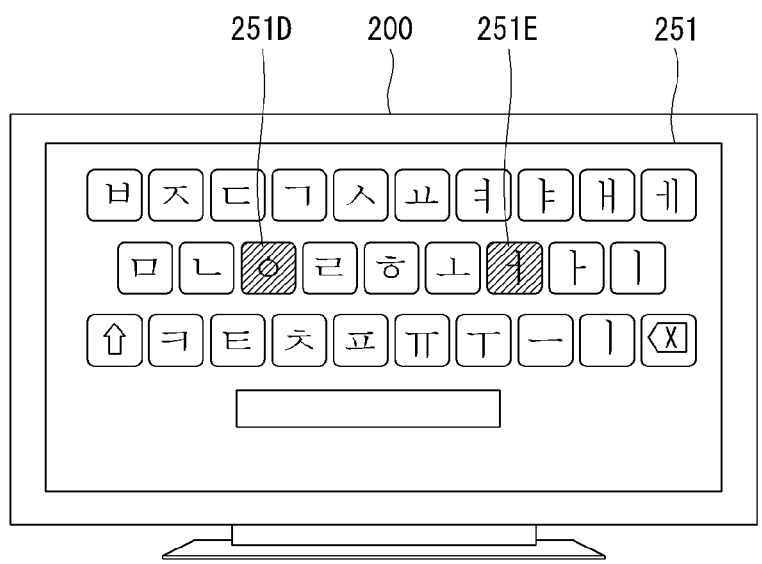
(b)

FIG. 28
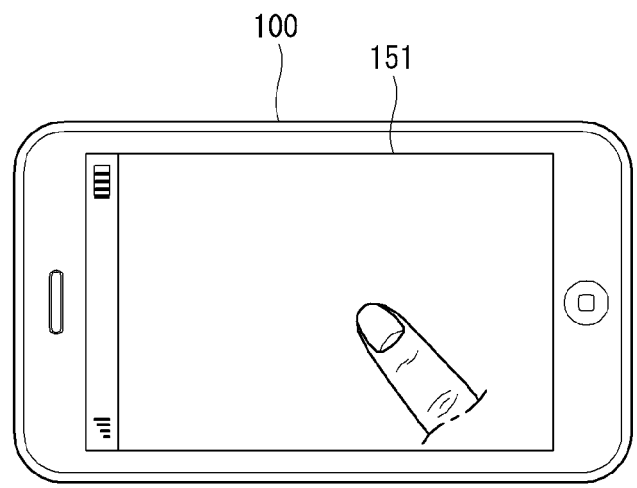
(a)
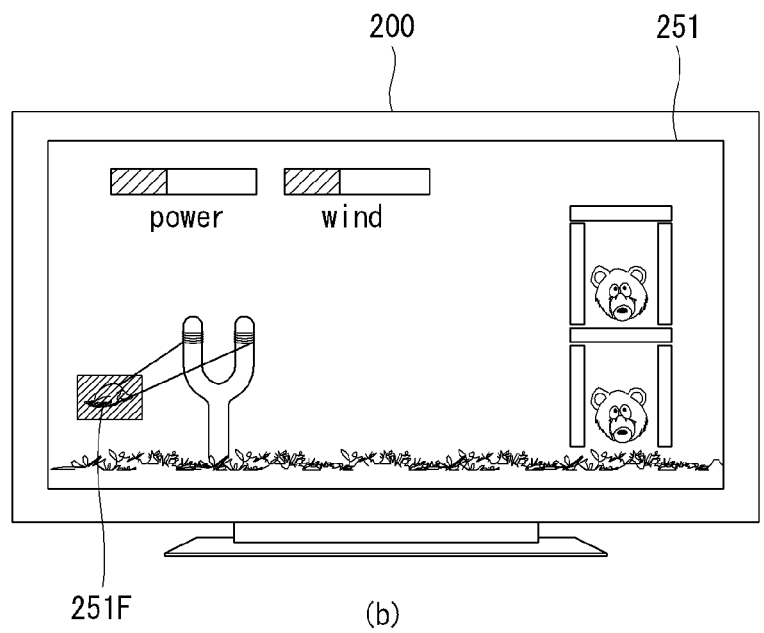
(b)

FIG. 36
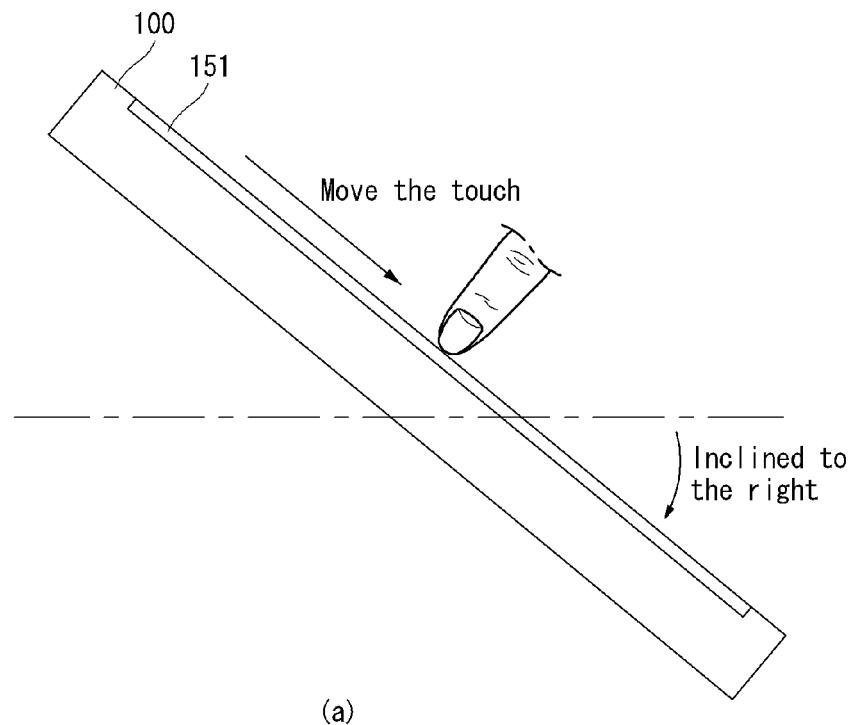
(a)
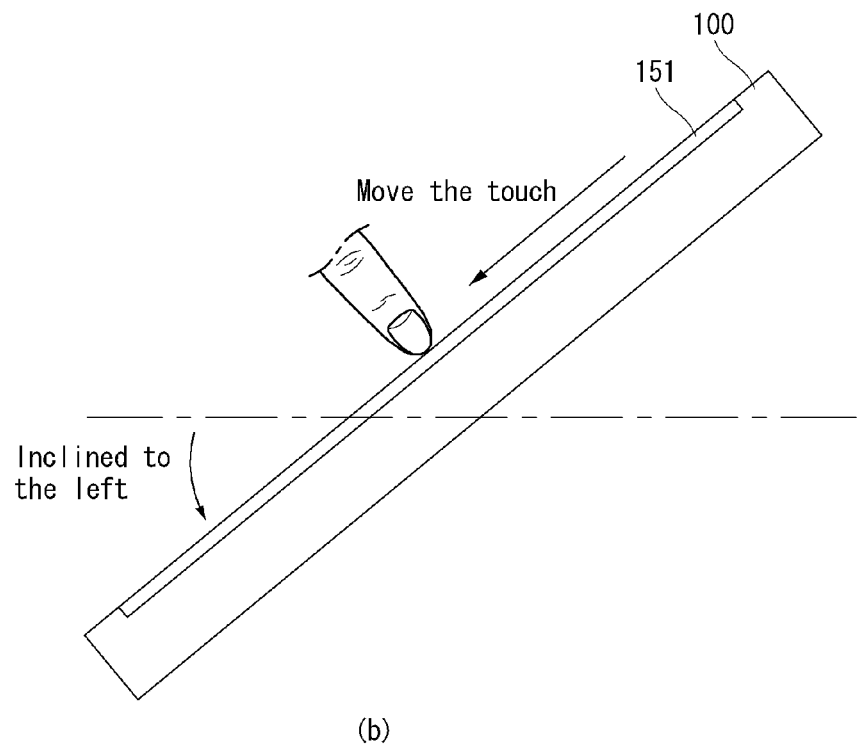
(b)

FIG. 38
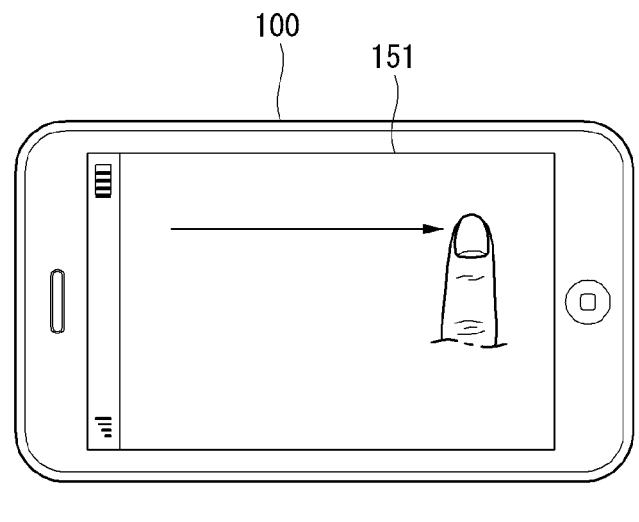
(a)
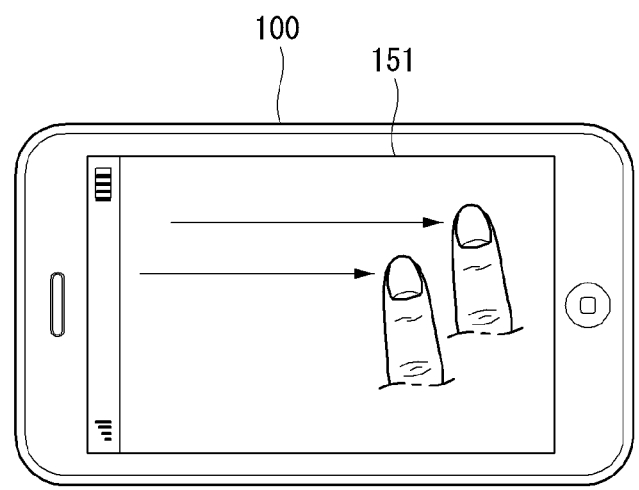
(b)

MOBILE TERMINAL

CROSS-REFERENCE TO RELATED APPLICATIONS

Pursuant to 35 U.S.C. §119, this application claims the benefit of earlier filing date and right of priority to Korean Application No. 10-2011-0070274, filed on Jul. 15, 2011, the contents of which are incorporated by reference herein in its entirety.

BACKGROUND

1. Field

The present invention relates to a mobile terminal comprising a touch screen and, more particularly, to a mobile terminal capable of outputting the execution screen of a specific application through another electronic device.

2. Background

A terminal, such as a personal computer, a notebook, a mobile phone, and a smart phone, may function as a multimedia player equipped with complex functions, such as taking a photograph, capturing a moving image, playing music, displaying a moving image file, playing a game, or receiving a broadcast. In order to support and enhance the expanding functions of a mobile terminal, improvements to structural and/or software parts of the terminal may be necessary.

SUMMARY

A mobile terminal according to the present invention may have the following advantages. The mobile terminal, according to the present invention, may execute an application through a display device connected thereto via a communication network. The mobile terminal may deactivate a function related to an application and use a touch screen as an input means for an executed application. Also, the mobile terminal may deactivate a function of an executed application and control the execution of the application. Control of the application may occur, for example, using a cursor guided by a user touch input received from the touch screen.

An exemplary embodiment of the mobile terminal may include a touch screen, a communication unit, and/or a controller. The touch screen may display the execution screen of a specific application. The communication unit may establish a communication network with a display device. The controller may output a result of the execution of the specific application through the display device when an output extension function is activated.

When the output extension function is activated, the controller may deactivate a specific function previously set via the touch screen and related to the specific application and set the touch screen as an input means including one or more control regions, each corresponding to a specific function of the specific application.

A mobile terminal according to another embodiment of the present invention may include a touch screen, a communication unit, and/or a controller. The touch screen may display the execution screen of a specific application. The communication unit may establish a communication network with a display device. The controller may output a result of the execution of the specific application through the display device, when an output extension function is activated.

Here, when the output extension function is activated, the controller may deactivate a specific function previously set via the touch screen and related to the specific application and then control the execution of the specific application using a cursor. The cursor may be displayed on the execution screen of the specific application displayed by the display device for tracking the position of a touch received through the touch screen.

BRIEF DESCRIPTION OF THE DRAWINGS

The accompany drawings, which are included to provide a further understanding of this document and are incorporated on and constitute a part of this specification illustrate embodiments of this document and together with the description serve to explain the principles of this document.

FIG. 15 shows examples where a reference region and control regions are displayed on the touch screen in accordance with the method shown in FIG. 7;

FIG. 25 shows an example of the execution of the method shown in FIG. 24;

FIGS. 27 and 28 show examples where a cursor is displayed in a predetermined region of the display device connected to the mobile terminal when a touch is received via the mobile terminal;

FIG. 36 shows an example where the movement of the cursor is controlled according to the method shown in FIG. 35;

FIG. 38 shows an example where the movement of a cursor is controlled according the method shown in FIG. 37;

DETAILED DESCRIPTION OF THE EMBODIMENTS

The present invention will now be described more fully with reference to the accompanying drawings, in which exemplary embodiments of the invention are shown. The invention may, however, be embodied in many different forms and should not be construed as being limited to the embodiments set forth herein; rather, there embodiments are provided so that this disclosure will be thorough and complete, and will fully convey the concept of the invention to those skilled in the art.

Hereinafter, a mobile terminal related to the present invention will be described below in more detail with reference to the accompanying drawings. In the following description, suffixes "module" and "unit" are given to components of the mobile terminal in consideration of only facilitation of description and do not have meanings or functions discriminated from each other.

The mobile terminal described in the specification can include a cellular phone, a smart phone, a laptop computer, a digital broadcast terminal, personal digital assistants (PDA), a portable multimedia player (PMP), a navigation system, a tablet computer, and other types of terminals.

Figure 1:
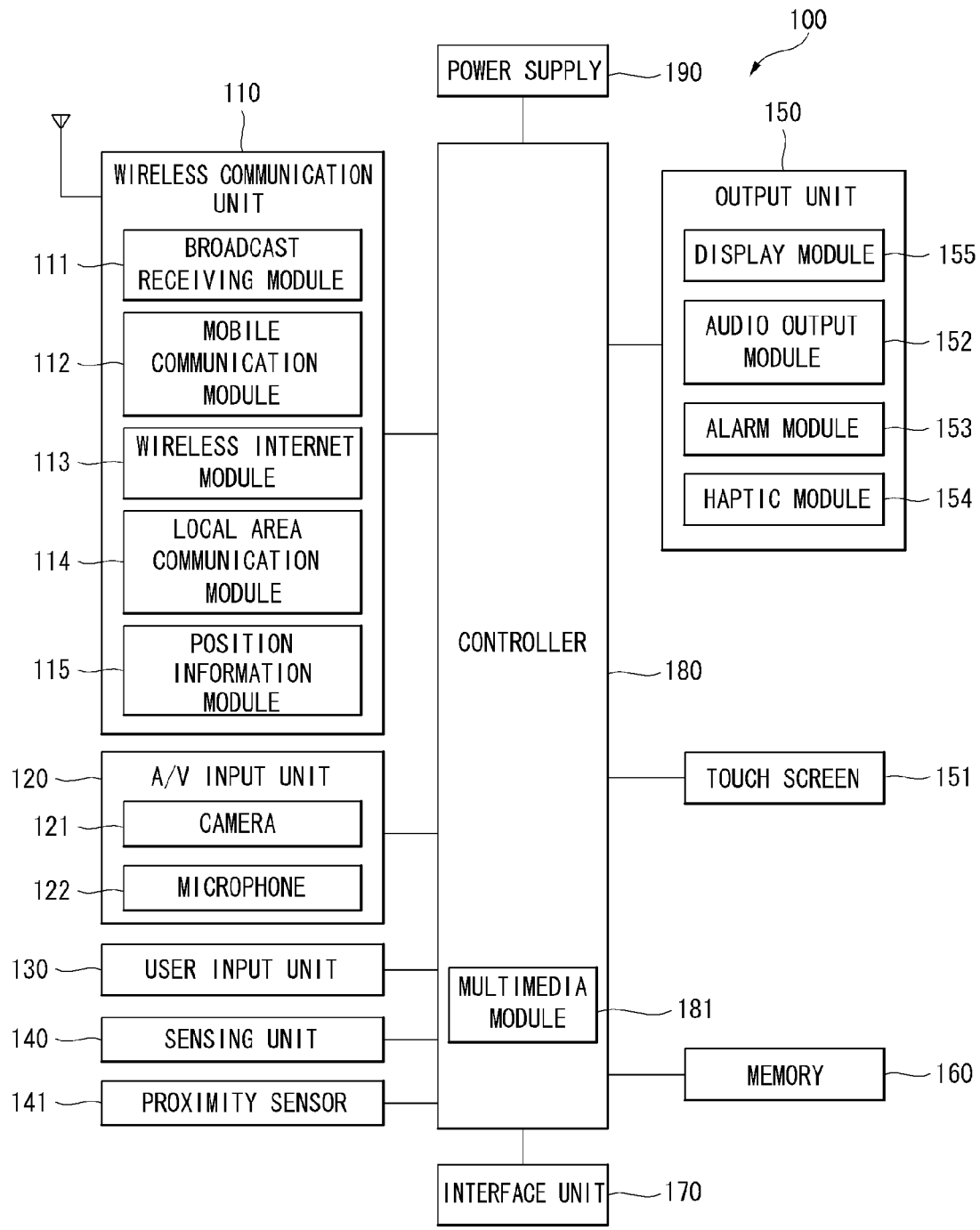
FIG. 1 is a block diagram of a mobile terminal according to an embodiment of the present invention.

FIG. 1 is a block diagram of an implementation of a mobile terminal 100. The mobile terminal 100 can include a wireless communication unit 110, an audio/video (A/V) input unit 120, a user input unit 130, a sensing unit 140, an output unit 150, a memory 160, an interface unit unit 170, a controller 180, and a power supply 190. The components shown in FIG. 1 are not essential parts and the number of components included in the mobile terminal can be varied.

The components of the mobile terminal will now be described. The wireless communication unit 110 can include at least one module that enables radio communication between the mobile terminal 100 and a radio communication system or between the mobile terminal 100 and a network in which the mobile terminal 100 is located. For example, the wireless communication unit 110 can include a broadcast receiving module 111, a mobile communication module 112, a wireless Internet module 113, a local area communication module 114 and a position information module 115.

The broadcast receiving module 111 receives broadcast signals and/or broadcast related information from an external broadcast management server through a broadcast channel.

The broadcast channel can include a satellite channel and a terrestrial channel. The broadcast management server can be a server that generates and transmits broadcast signals and/or broadcast related information or a server that receives previously created broadcast signals and/or broadcast related information and transmits the broadcast signals and/or broadcast related information to a terminal. The broadcast signals can include not only television broadcast signals, radio broadcast signals and data broadcast signals but also signals in the form of combination of television broadcast signal and radio broadcast signal.

The broadcast related information can be information on a broadcast channel, a broadcast program or a broadcast service provider. The broadcast related information can be provided through a mobile communication network and the broadcast related information can be received by the mobile communication module 112.

The broadcast related information can exist in various forms. For example, the broadcast related information can exist in the form of electronic program guide (EPG) of digital multimedia broadcast (DMB) or in the form of electronic service guide (ESG) of digital video broadcast-handheld (DVB-H).

The broadcast receiving module 111 receives broadcast signals using various broadcast systems. Particularly, the broadcast receiving module 111 can receive digital broadcast signals using digital broadcast systems such as digital multimedia broadcast-terrestrial (DMB-T), digital multimedia broadcast-satellite (DMB-S), media forward link only (MediaFLO), DVB-H and integrated services digital broadcast-terrestrial (ISDB-T) systems. The broadcast receiving module 111 can be constructed to be suited to broadcast systems providing broadcast signals other than the above-described digital broadcast systems.

The broadcast signals and/or broadcast related information received via the broadcast receiving module 111 can be stored in the memory 160. The mobile communication module 112 transmits/receives a radio signal to and/or from at least one of a base station, an external terminal and a server of a mobile communication network. The radio signal can include a voice call signal, a video telephony call signal or data in various forms according to transmission and receiving of text/multimedia messages.

The wireless Internet module 113 is a module for wireless Internet access and can either be included in the mobile terminal 100 or externally attached to the mobile terminal 100. Wireless LAN (WLAN) (Wi-Fi), wireless broadband (Wibro), world interoperability for microwave access (Wimax), high speed downlink packet access (HSDPA), and other techniques can be used as a wireless Internet technique.

The local area communication module 114 is a module for local area communication. Bluetooth™, radio frequency identification (RFID), infrared data association (IrDA), ultra wideband (UWB) and ZigBee™ can be used as a local area communication technique.

The position information module 115 confirms or obtains the position of the mobile terminal 100. A global positioning system (GPS) module is a representative example of the position information module 115. According to the current technology, the GPS module 115 can calculate information on distances between one point (object) and at least three satellites. The GPS module 115 can also calculate information on the time when the distance information is measured and apply trigonometry to the obtained distance information to obtain three-dimensional position information on the point (object) according to latitude, longitude and altitude.

Furthermore, a method of calculating position and time information using three satellites and correcting the calculated position and time information using another satellite is also used. In addition, the GPS module 115 continuously calculates the current position in real time and calculates velocity information using the position information.

The A/V input unit 120 is used to input an audio signal or a video signal and can include a camera 121 and a microphone 122. The camera 121 processes image frames of still images or moving images obtained by an image sensor in a video telephony mode or a photographing mode. The processed image frames can be displayed on a display module 155.

The image frames processed by the camera 121 can be stored in the memory 160 or transmitted to an external device via the wireless communication unit 110. Some mobile terminals 100 may include at least two cameras 121.

The microphone 122 receives an external audio signal in a call mode, a recording mode or a speed recognition mode and processes the received audio signal into electric audio data. The audio data can be converted into a form that can be transmitted to a mobile communication base station via the mobile communication module 112 and output in the call mode. The microphone 122 can employ various noise removal algorithms for removing noise generated when the external audio signal is received.

The user input unit 130 receives input data for controlling the operation of the mobile terminal 100 from a user. The user input unit 130 can include a keypad, a dome switch, a touch pad (constant voltage/capacitance), jog wheel, jog switch and other input devices.

The sensing unit 140 senses the current state of the mobile terminal 100, such as open/close state of the mobile terminal, the position of the mobile terminal, whether a user touches the mobile terminal, the direction of the mobile terminal and acceleration/deceleration of the mobile terminal and generates a sensing signal for controlling the operation of the mobile terminal. For example, the sensing unit 140 can sense whether a slide phone is opened or closed when the mobile terminal 100 is a slide phone. Furthermore, the sensing unit 140 can sense whether the power supply 190 supplies power and whether the interface unit unit 170 is connected to an external device. The sensing unit 140 can include a proximity sensor.

The output unit 150 generates visual, auditory or tactile output and can include a display module 155, an audio output module 152, an alarm module 153 and a haptic module 154.

The display module 155 displays information processed by the mobile terminal 100. For example, the display module 155 displays a user interface unit (UI) or a graphic user interface unit (GUI) related to a telephone call when the mobile terminal 100 is in the call mode. The display module 155 displays a captured or/and received image, UI or GUI when the mobile terminal 100 is in the video telephony mode or the photographing mode.

The display module 155 can include at least one of a liquid crystal display, a thin film transistor liquid crystal display, an organic light-emitting diode display, a flexible display and a three-dimensional display.

Some of these displays can be of a transparent type or a light transmission type. This can be referred to as a transparent display. The transparent display includes a transparent liquid crystal display.

The rear structure of the display module 155 can also be of the light transmission type. According to this structure, a user can see an object located behind the body of the mobile terminal 100 through an area of the body of the mobile terminal, which is occupied by the display module 155.

The mobile terminal 100 can include at least two display modules 155 according to the construction of the terminal. For example, the mobile terminal 100 can include a plurality of display modules 155 that are arranged on a single side of the mobile terminal at a predetermined distance or integrated. Otherwise, the plurality of display modules 155 can be arranged on different sides of the mobile terminal.

The display module 155 and a sensor sensing touch (referred to as a touch sensor hereinafter) may form a layered structure, which is referred to as a touch screen hereinafter. The display module 155 of the touch screen can be used as an input device in addition to an output device. The touch sensor can be, for example, a touch film, a touch sheet or a touch pad.

The touch sensor can be constructed such that it converts a variation in pressure applied to a specific portion of the display module 155 or a variation in capacitance generated at a specific portion of the display module into an electric input signal. The touch sensor can be constructed such that it can sense pressure of touch as well as the position and area of touch.

When touch input is applied to the touch sensor, a signal corresponding to the touch input is transmitted to a touch controller (not shown). The touch controller processes the signal and transmits data corresponding to the processed signal to the controller 180. Accordingly, the controller 180 can detect a touched portion of the display module 155.

The proximity sensor 141 can be located in an internal region of the mobile terminal 100, either surrounded by the touch screen or near the touch screen. The proximity sensor 141 senses an object approaching a predetermined sensing face or an object located near the proximity sensor by using electromagnetic force or infrared rays without having mechanical contact. The proximity sensor 141 has a lifetime longer than that of a contact sensor and has wider application.

The proximity sensor 141 may include a transmission type photo-electric sensor, a direct reflection type photo-electric sensor, a mirror reflection-type photo-electric sensor, a high-frequency oscillating proximity sensor, a capacitive proximity sensor, a magnetic proximity sensor, an infrared proximity sensor, or similar sensor.

A capacitive touch screen is constructed such that proximity of a pointer is detected through a variation in an electric field according to the proximity of the pointer. In this case, the touch screen (touch sensor) can be classified as the proximity sensor 141.

For convenience of explanation, an action of the pointer approaching the touch screen while the pointer is not in contact with the touch screen, such that location of the pointer on the touch screen is recognized, is referred to as "proximity touch" and an action of the pointer making contact with the touch screen is referred to as "contact touch" in the following description. A touch point refers to the configuration where the pointer is substantially perpendicular to the touch screen while the pointer proximity-touches the touch screen.

The proximity sensor 141 senses a proximity touch and a proximity touch pattern (for example, a proximity touch distance, a proximity touch direction, a proximity touch velocity, a proximity touch time, a proximity touch position, a proximity touch moving state, etc.). Information corresponding to the sensed proximity touch action and proximity touch pattern can be displayed on the touch screen.

The audio output module 152 can output audio data received from the wireless communication unit 110 or stored in the memory 160 in a call signal receiving mode, a telephone call or recording mode, a speech recognition mode and a broadcast receiving mode. The audio output module 152 outputs audio signals related to functions (for example, a call signal incoming tone, a message incoming tone, etc.) performed in the mobile terminal 100. The audio output module 152 can include a receiver, a speaker, a buzzer, or other type of audio output device.

The alarm module 153 outputs a signal for indicating generation of an event of the mobile terminal 100. Examples of events generated in the mobile terminal 100 include receiving a call signal, receiving a message, inputting a key signal, inputting a touch, or other type of event. The alarm module 153 can output signals in forms different from video signals or audio signals, such as, for example, a signal for indicating generation of an event via vibration. The video signals or the audio signals can be also output via the display module 155 or the audio output module 152.

The haptic module 154 generates various haptic effects that the user can feel. A representative example of a haptic effect is vibration. The intensity and pattern of vibration generated by the haptic module 154 can be controlled. For example, different vibrations can be combined and output or sequentially output.

The haptic module 154 can generate a variety of haptic effects. The haptic effects include: an effect of stimulus according to arrangement of pins vertically moving for a contact skin face, an effect of stimulus according to jet force or sucking force of air through a jet hole or a sucking hole, an effect of stimulus rubbing the skin, an effect of stimulus according to contact of an electrode, an effect of stimulus using electrostatic force and an effect according to reproduction of cold and warmth using an element capable of absorbing or radiating heat in addition to vibration.

The haptic module 154 can transmit haptic effects via direct contact and also allow the user to feel haptic effects via kinesthetic sense of his fingers or arms. The mobile terminal 100 can include at least two haptic modules 154 according to the construction of the mobile terminal.

The memory 160 can store a program for the operation of the controller 180 and temporarily store input/output data (for example, phone book, messages, still images, moving images, etc.). The memory 160 can store data about vibrations and sounds in various patterns, which are output when a touch input is applied to the touch screen.

The memory 160 can include at least a flash memory, a hard disk type memory, a multimedia card micro type memory, a card type memory (for example, SD or XD memory), a random access memory (RAM), a static RAM (SRAM), a read-only memory (ROM), an electrically erasable programmable ROM (EEPROM), a programmable ROM (PROM) magnetic memory, a magnetic disk and an optical disk. The mobile terminal 100 can operate in relation to web storage performing the storing function of the memory on the Internet.

The interface unit 170 serves as a path to all external devices connected to the mobile terminal 100. The interface unit 170 receives power or data from the external devices and transmits the data or power to the internal components of the mobile terminal 100 or transmits data of the mobile terminal 100 to the external devices.

The interface unit 170 can include a wired and/or wireless headset port, an external charger port, a wired and/or wireless data port, a memory card port, a port for connecting a device having a user identification module, an audio I/O port, a video I/O port, an earphone port, or other type of port.

A user identification module is a chip that stores information for authenticating the authority to use the mobile terminal 100 and can include a user identify module (UIM), a subscriber identify module (SIM) and a universal subscriber identify module (USIM). A device (hereinafter referred to as an identification device) including the identification module can be manufactured in the form of a smart card. Accordingly, the identification device can be connected to the mobile terminal 100 through a card slot included in the interface unit 170.

The construction of the mobile terminal 100 according to the embodiments of the present invention has been described with reference to FIG. 1. Hereinafter, technical characteristics will be described regarding the mobile terminal 100 of the present invention. The present invention is capable of outputting a result of the execution of an application being executed via another display device connected to the mobile terminal 100 over a communication network and is described in detail.

Figure 2:
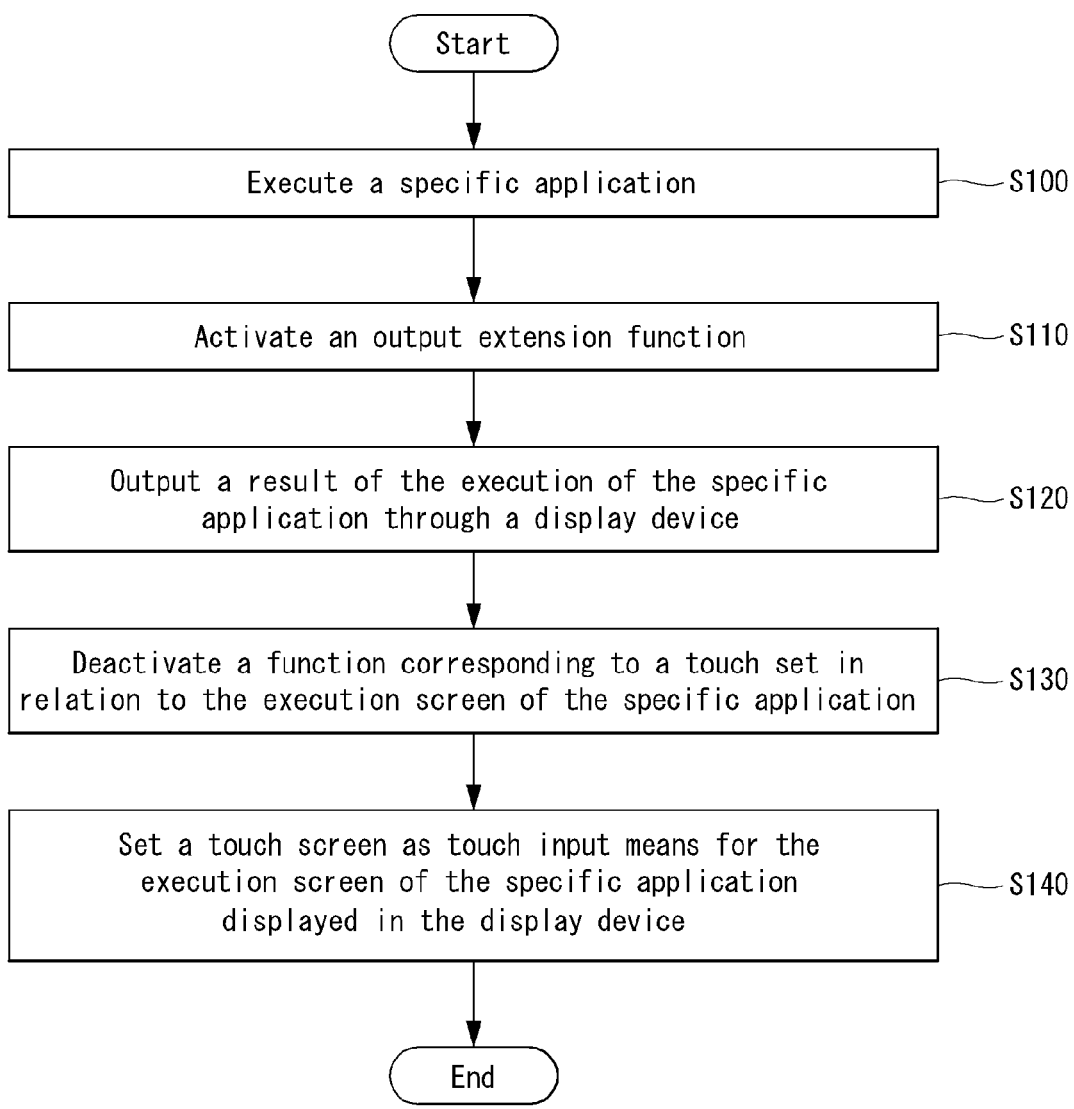
FIGS. 2 and 3 are flowcharts illustrating a method of the mobile terminal executing an application according to an embodiment of the present invention.
Figure 3:
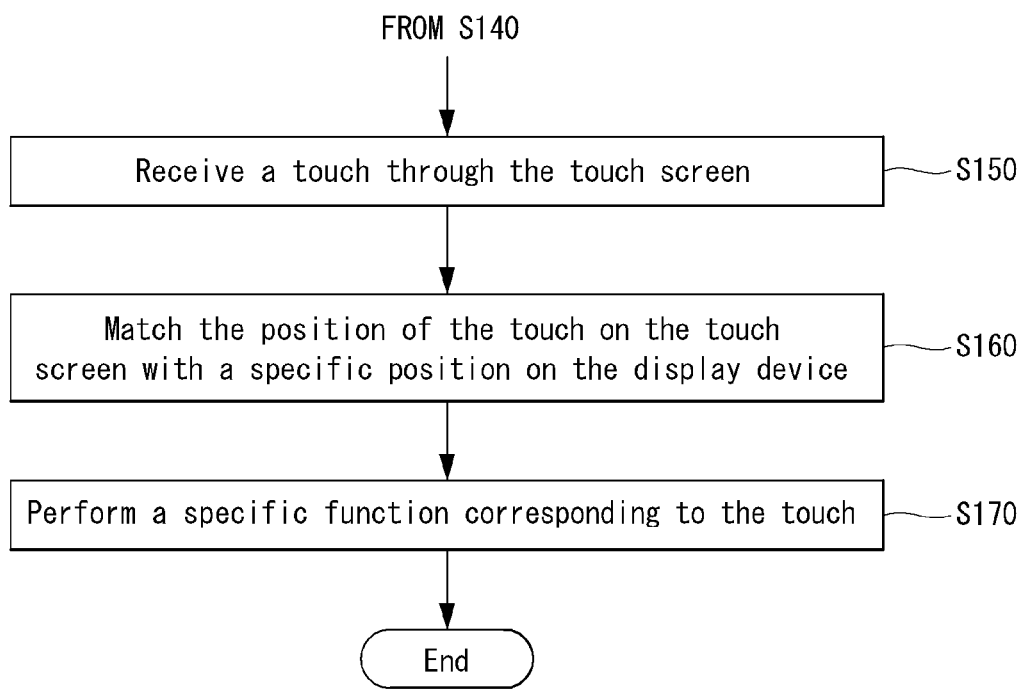

FIGS. 2 and 3 are flowcharts illustrating a method of the mobile terminal 100 executing an application according to an embodiment of the present invention. The method is described with reference to relevant drawings.

The controller 180 of the mobile terminal 100 executes a specific application which is selected by a user's touch on the touch screen 151 at step S100. When the user touches a soft key for extending the output displayed on the touch screen 151 or presses a hardware button for extending the output in the state, the controller 180 activates the output extension function of the mobile terminal 100 at step S110.

The output extension function of the mobile terminal 100 refers to a function of outputting a result of the execution of an application in the mobile terminal via another electronic device. According to an example of the output extension function, the mobile terminal 100 may output a result of the execution of a video play application via a large-size display or a display device, such as television or a PC including a large-size speaker. According to another example of the output extension function, the mobile terminal 100 may output a result of the execution of a music play application via an audio system including a large-size speaker. It is, however, to be noted that the output extension function of the mobile terminal 100 according to the present invention is not limited to the examples described herein.

Figure 4:
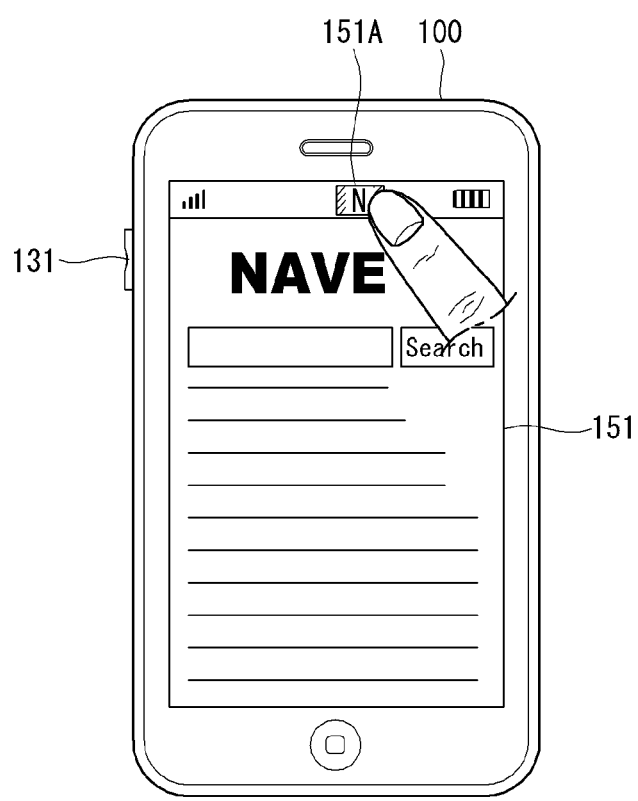
FIG. 4 shows a process of outputting a result of the execution of a web browsing application, which can be executed in the mobile terminal through a display device in accordance with the method shown in FIG. 2.

FIG. 4 shows a process of outputting a result of the execution of a web browsing application shown in FIG. 2 by the mobile terminal 100 via its display device. Referring to FIG. 4, a user may execute the output extension function of the mobile terminal 100 by touching a soft key 151A displayed on the touch screen 151 of the mobile terminal. In some embodiments, the user may execute the output extension function of the mobile terminal 100 by pressing a hardware key 131 which is provided in the mobile terminal 100.

When the output extension function is activated, the controller 180 outputs the result of the execution of the specific application via a predetermined display device at step S120. Furthermore, when the output extension function is activated, the controller 180 deactivates a function corresponding to a touch which has been set in relation to the execution screen of the specific application displayed via the touch screen 151 at step S130. In this case, even though the user touches the execution screen of the specific application, the controller 180 does not execute the function corresponding to the touch on the execution screen of the specific application.

Furthermore, when the output extension function is activated, the controller 180 sets the touch screen 151 as a touch input means for the execution screen of the specific application displayed via the display device at step S140. Next, when a touch is received via the touch screen 151 at step S150, the controller 180 matches a position of the touch on the touch screen with a specific position on the display device at step S160. A cursor moving according to the movement of the touch on the touch screen 151 may be displayed via the display device according to a result of the matching of the touch.

When the touch on the touch screen 151 is matched with the specific position on the display device, the controller 180 performs a specific function for the specific application. The specific function corresponds to the touch matched with the specific position on the display device at step S170. In other words, when the output extension function is activated in the mobile terminal 100, a touch on the touch screen 151 is not recognized as a touch on the execution screen of the specific application. Instead, the touch is recognized as a touch on the display device.

The steps S120 through S140 of FIG. 2 are illustrated to be sequentially performed, but this is only an implementation example of the present invention. Steps S120 through S140 may be performed in a different sequence and, alternatively, steps S120 through S140 may be performed at the same time.

Figure 5:
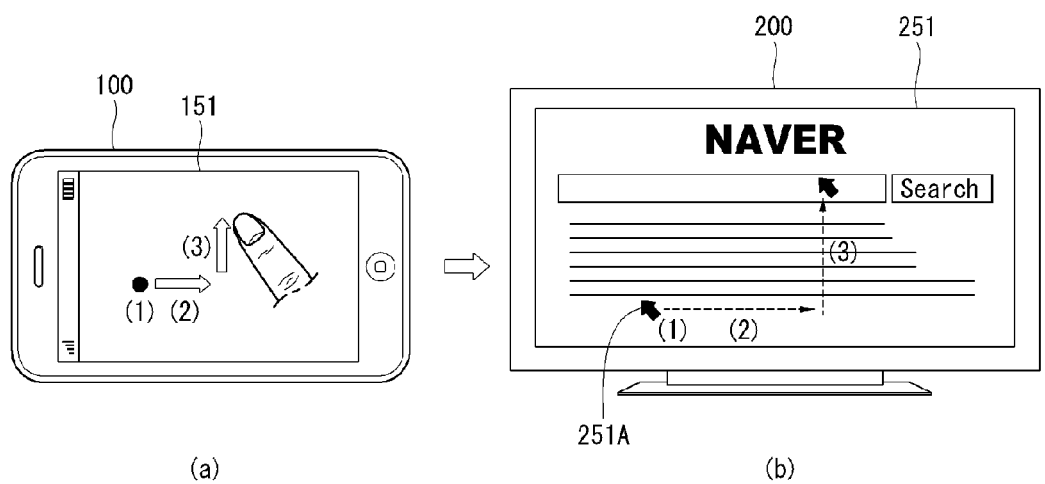
FIG. 5 shows an example where the operation of an application displayed by the display device is controlled by using the touch screen of the mobile terminal in accordance with the method shown in FIGS. 2 and 3.

FIG. 5 shows an example where the operation of an application displayed via a display device is controlled by using the touch screen 151 of the mobile terminal 100 in accordance with the method shown in FIGS. 2 and 3. FIG. 5(a) shows a user's touch being received via the touch screen 151 in the state where the output extension function was activated. FIG. 5(b) further shows a cursor being moved in the display device in response to the touch received via the touch screen 151.

First, the user touches a specific point of the touch screen 151. In response, the controller 180 displays a cursor 251A on the execution screen of a web browsing application displayed the display device 200. In FIG. 5, the user touch of the specific point of the touch screen 151 corresponds to an operation of moving a cursor to the specific point by using a mouse in a PC.

The user can initiate a touch of a specific point on the touch screen 151, then move the touch to the right, and subsequently move the touch upwardly. In response the controller 180 moves the cursor 251A along a path matched with the moving path of the touch in the execution screen of the web browsing application displayed by the display device.

Figure 6:
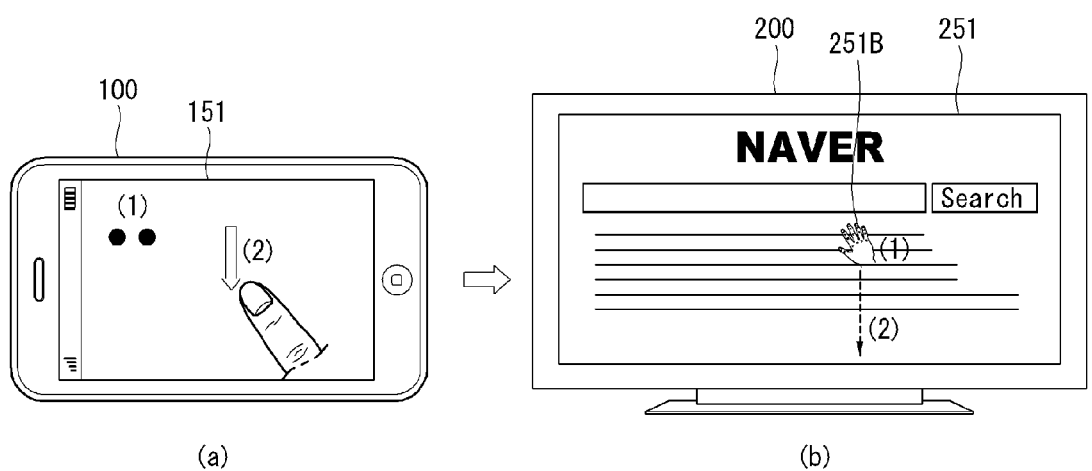
FIG. 6 shows another example where the operation of an application displayed by the display device is controlled by using the touch screen of the mobile terminal in accordance with the method an application shown in FIGS. 2 and 3.

FIG. 6 shows another example where the operation of an application displayed by the display device is controlled by using the touch screen 151 of the mobile terminal 100 in accordance with the method shown in FIGS. 2 and 3. FIG. 6(a) shows that a user's touch is received via the touch screen 151 in the state where the output extension function has been activated. FIG. 6(b) shows that a cursor is moved in the display device in response to the touch received via the touch screen 151.

First, the user touches a specific point of the touch screen 151. In response, the controller 180 displays a cursor 251B on the execution screen of a web browsing application displayed by the display device 200. An action that the user touches the specific point of the touch screen 151 in FIG. 6 corresponds to an operation of selecting a screen by using a mouse wheel to move a screen in a PC.

After touching a specific point twice, the user moves the touch on the touch screen 151 downwardly. In response, the controller 180 moves the execution screen of the web browsing application displayed by the display device 200 downwardly.

Figure 7:
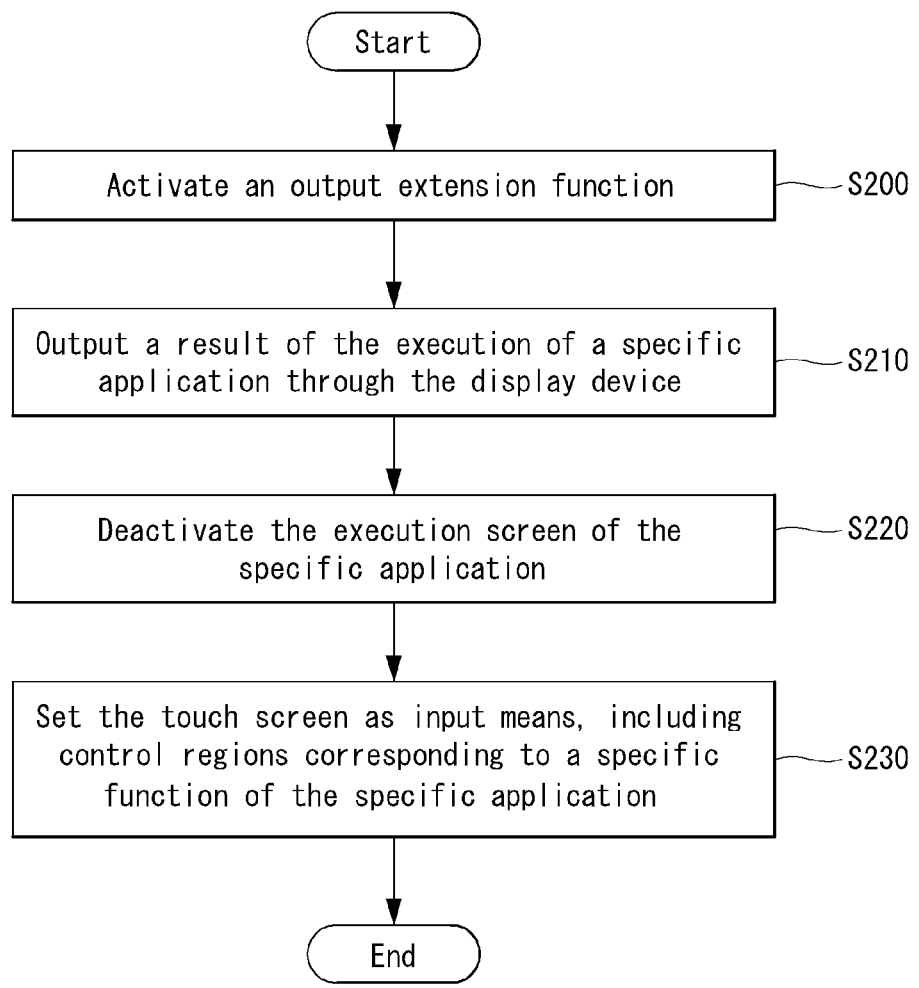
FIG. 7 is a flowchart illustrating a method of the mobile terminal executing an application according to another embodiment of the present invention.

FIG. 7 is a flowchart illustrating a method of the mobile terminal 100 executing an application according to another embodiment of the present invention. The method of FIG. 7 is described with reference to relevant drawings.

As described with reference to FIG. 4, when a user presses the soft key 151A or the hardware button 131 for the output extension function while a specific application is executed, the controller 180 activates the output extension function at step S200.

When the output extension function is activated, the controller 180 outputs a result of the execution of the specific application via the display device 200, which is connected to the mobile terminal 100 over a network via the wireless communication unit 110 at step S210. Next, the controller 180 deactivates the execution screen of the specific application being displayed by the touch screen 151 at step S220.

The deactivation of the execution screen of the specific application means that a function, previously set and related to the execution screen of the specific application, is deactivated based on a position of a touch received via the touch screen 151.

According to an example where a function related to the execution screen of the specific application is deactivated, the controller 180 may only block a response to a touch in the state where the execution screen of the specific application is displayed by the touch screen 151. According to another example, where a function related to the execution screen of the specific application is deactivated, the controller 180 may block the execution screen of the specific application from being displayed by the touch screen 151.

After the execution screen of the specific application is deactivated, the controller 180 can set the touch screen 151 as an input means. The input means can include control regions corresponding to a specific function of the specific application, as shown at step S230. In such an example, the user may execute the specific function of the specific application by touching the control region.

Figure 8:
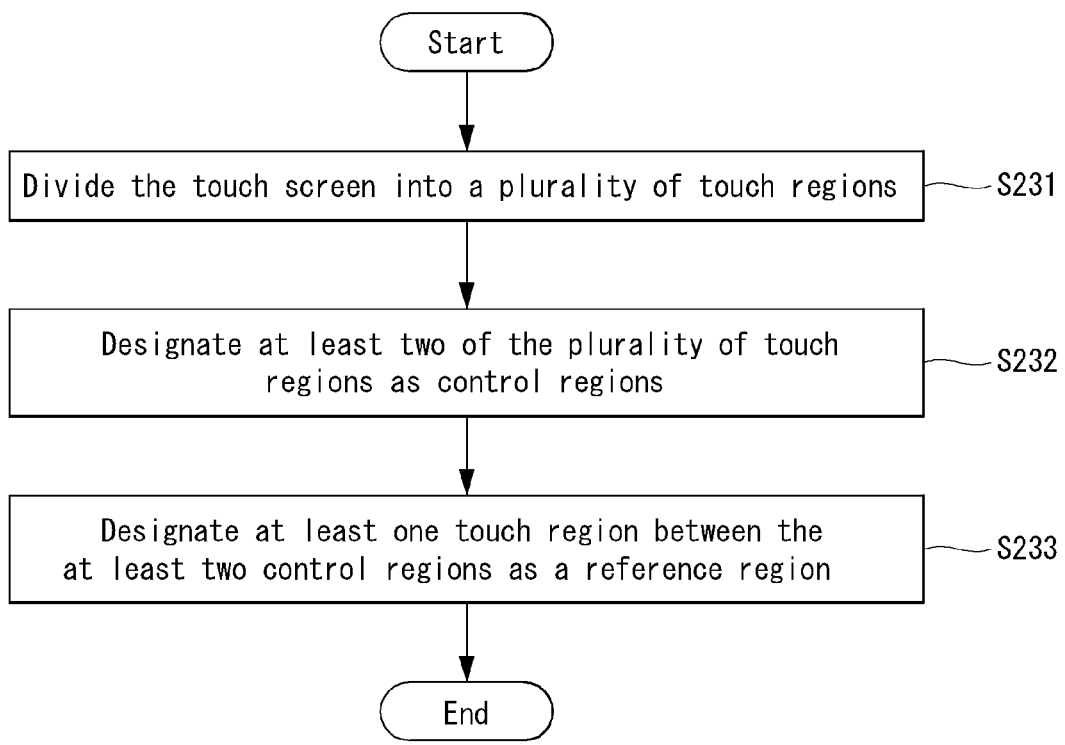
FIG. 8 is a flowchart illustrating a process of setting a touch screen as an input means for performing a specific function of a specific application in accordance with the method shown in FIG. 7.

FIG. 8 is a flowchart illustrating a process of setting the touch screen 151 as an input means for performing a specific function of a specific application in accordance with the method shown in FIG. 7. The process of setting the touch screen 151 as the input means is described with reference to relevant drawings.

First, the controller 180 of the mobile terminal 100 divides the touch screen 151 into a plurality of touch regions at step S231. Here, the form, area, and arrangement of the plurality of touch regions may be previously determined according to a type of an application executed in the mobile terminal 100 and stored in the memory 160. Furthermore, the form of the plurality of touch regions may be modified or changed by a user.

Next, at step S232, the controller 180 allocates at least two of the plurality of touch regions as control regions corresponding to specific functions of the specific application. As shown at step S233, at least one touch region between the at least two control regions is allocated to a reference region for distinguishing the at least two control regions from each other. The user can determine whether the plurality of touch regions is allocated as control regions or whether the reference region is predetermined and stored in the memory 160.

Unlike in FIG. 8, the controller 180 may also set the plurality of touch regions as a one or more control regions corresponding to a specific function of the specific application. In other words, the controller 180 may set the entire touch screen 151 as a control region for a specific function of the specific application.

Figure 9:
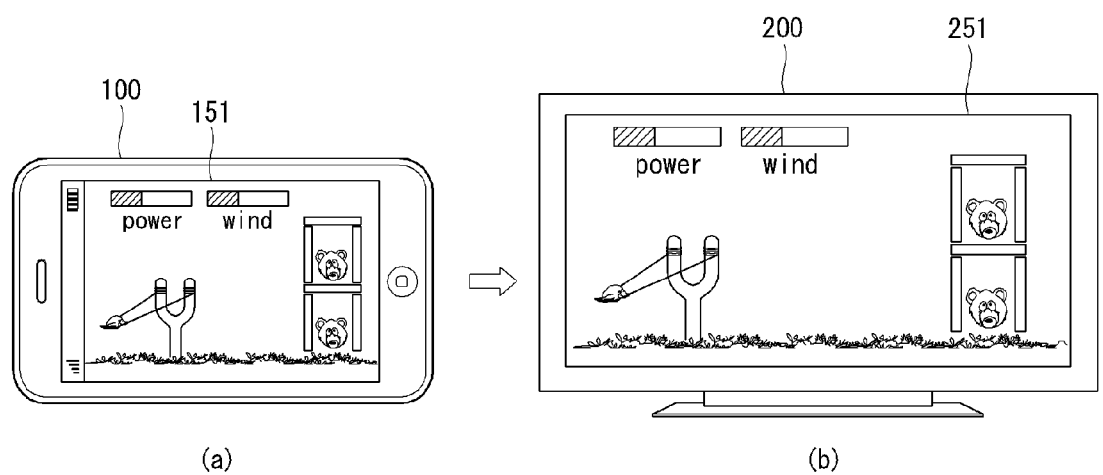
FIG. 9 shows that a result of a game application being executed in the mobile terminal is output via the display device in accordance with the method shown in FIG. 7.

FIG. 9 shows a result of the execution of a game application shown in FIG. 7. The output of the execution of the game application is displayed on the display device 200.

FIG. 9 shows that, when the output extension function is activated in the state where a specific game is executed in the mobile terminal 100, a result of the execution of the specific game is output via the display device 200. Although not shown in FIG. 9, the controller 180 may also output sound according to execution of the specific game via the sound output unit of the display device 200.

Figure 10:
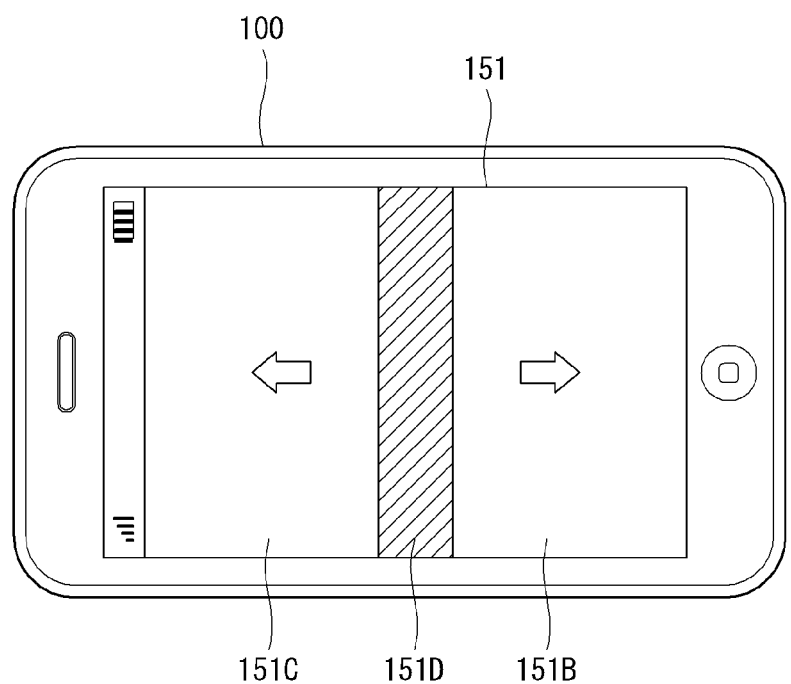
FIGS. 10 to 12 show examples where control regions and a reference region are set on the touch screen in accordance with the method shown in FIG. 7.
Figure 11:
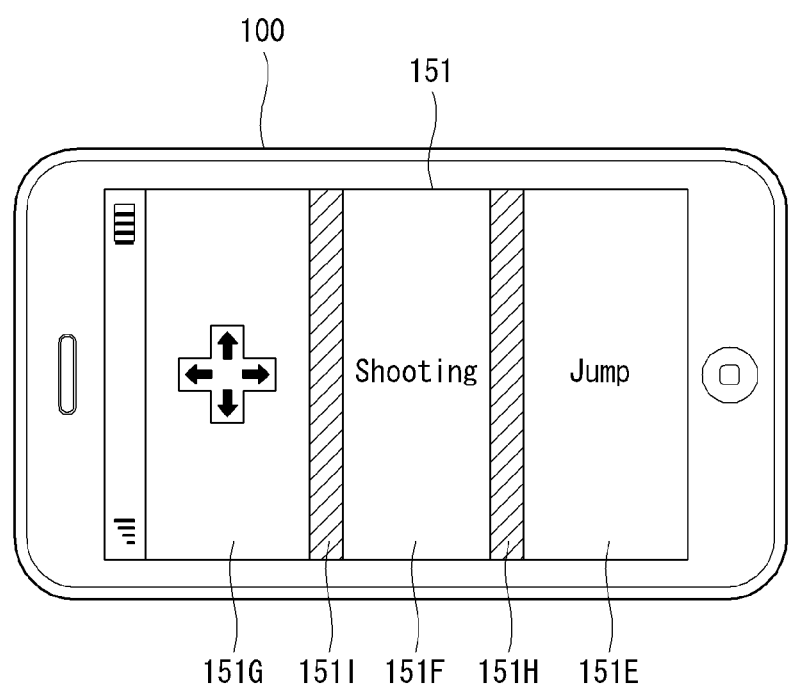
Figure 12:
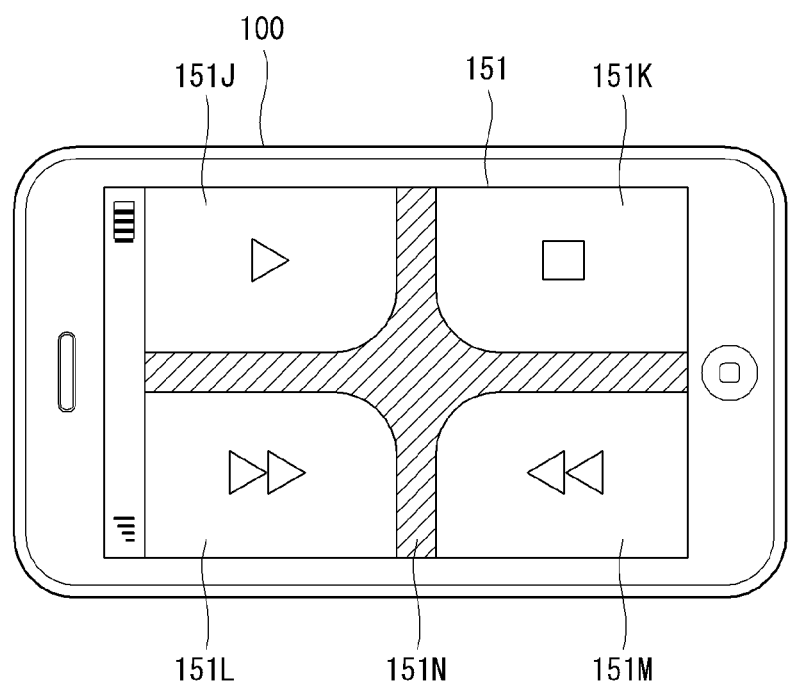

FIGS. 10 through 12 show examples where control regions and a reference region are set on the touch screen 151 in accordance with the method of the mobile terminal 100 executing an application shown in FIG. 7.

FIG. 10 shows that, if the output extension function is activated while a specific game application is executed in the mobile terminal 100, the touch screen 151 is divided into a control region 151B corresponding to (1) a function for moving the character of the specific game application in a first direction, (2) a control region 151C corresponding to a function for moving the character in a second direction, and (3) a reference region 151D for distinguishing the control regions 151B and 151C from each other.

In other words, the controller 180 may control a motion of a specific object displayed by the execution screen in response to a touch received at a control region.

As shown in FIG. 10, the controller 180 may display the control regions 151B and 151C and the reference region 151D on the touch screen 151. In such a case, a user may perform the relevant functions by touching the control regions 151B and 151C of the touch screen 151 while visually checking the regions displayed by the touch screen 151.

Unlike in FIG. 10, however, the controller 180 may only divide the touch screen 151 into the control regions 151B and 151C and the reference region 151D. The controller may not display the regions on the touch screen 151 by visually dividing each of the regions. In such a case, when a user touches the reference region 151D, the controller 180 may output feedback via the mobile terminal 100 or the display module. The feedback indicating that the user has touched the reference region may include vibration, sound, an image, or other type of feedback.

When the feedback is output, the user may recognize that it has touched the reference region 151D and execute a relevant function by selectively touching the control region 151B on the right side or the control region 151C on the left side on the basis of the touch point. In this case, the user must have recognized that the control region 151B on the right side of the reference region 151D is a control region corresponding to rightward movement of a game character and recognize that the control region 151C on the left side of the reference region 151D is a control region corresponding to leftward movement of a game character.

In order to transfer information about the regions to a user, the controller 180 may display the regions 151B, 151C and 151D on the touch screen 151 for a specific period of time after the output extension function has been activated or may display the information about the regions 151B, 151C and 151D on the display device 200. In some embodiments, the controller 180 may output the information about the regions 151B, 151C and 151D of the touch screen 151 via the mobile terminal 100 or the display device 200 in the form of a sound signal.

FIG. 11 shows that, if the output extension function is activated while a shooting game application is executed in the mobile terminal 100, the touch screen 151 is divided into (1) a control region 151E corresponding to a jump function of a character in the shooting game application, (2) a control region 151F corresponding to a shooting function of the character, (3) a control region 151G corresponding to a movement function of the character, and (4) reference regions 151H and 151I for distinguishing the control regions 151E, 151F and 151G from each other.

As shown in FIG. 11, the controller 180 may display the control regions 151E, 151F, and 151G and the reference regions 151H and 151I on the touch screen 151. In this case, a user may perform the relevant functions by touching the control regions 151E, 151F, and 151G of the touch screen 151 while visually checking the regions displayed by the touch screen 151.

Unlike in FIG. 11, however, the controller 180 may not display the plurality of regions 151E, 151F, 151G, 151H and 151I on the touch screen 151. In such a case, if a user touches the reference regions 151H and 151I, the controller 180 may output feedback via the mobile terminal 100 or the display module 155.

The output of the feedback via the mobile terminal 100 or the display module 155 has been described previously with reference to FIG. 10. If the plurality of reference regions 151H and 151I are set as shown in FIG. 11, the controller 180 may output different feedback corresponding to the respective reference regions so that the reference regions where touches are generated can be distinguished from each other.

For example, the controller 180 may vary the amount of vibration generated, the intensity of vibration, the length of vibration, or other characteristic of vibration, based on a reference region where a touch is generated, so that the user can recognize a reference region that is touched. For another example, the controller 180 may produce different sound or output an image based on a reference region where a touch is generated so that the user can recognize a reference region that is touched.

As described with reference to FIGS. 10 and 11, the controller 180 of the mobile terminal 100 may display the control regions on the display module 155 of the mobile terminal 100 and may display the control regions in the display device 200 connected to the mobile terminal 100.

If content output via the display device 200 according to a result of the execution of a specific application in the mobile terminal 100 is a moving image, a movie, or other image, it is preferred that the control region be displayed only by the mobile terminal 100, but not be displayed by the display device 200. This is because the content output via the display device 200 may be covered by the control region.

FIG. 12 shows that, if the output extension function is activated while a music play application is executed in the mobile terminal 100, the touch screen 151 is divided into control regions 151J to 151M and a reference region 151N for controlling the play of music. The plurality of regions displayed in FIG. 12 may be visually displayed by the touch screen 151 or may not be displayed by the touch screen 151. This has been described with reference to FIGS. 10 and 11.

Figure 13:
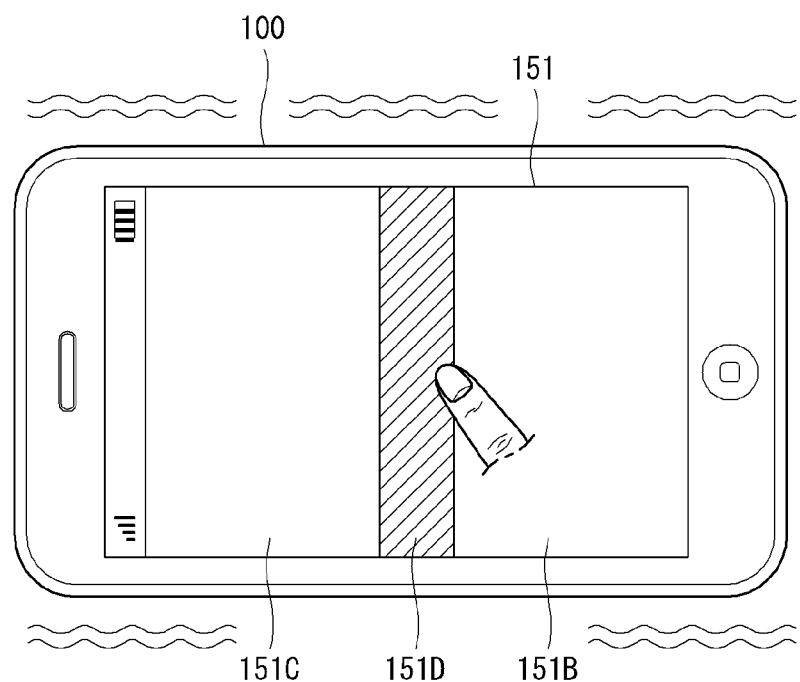
FIGS. 13 and 14 show examples where feedback informing that a user's touch has been received is output via the reference region in accordance with the method shown in FIG. 7.
Figure 14:
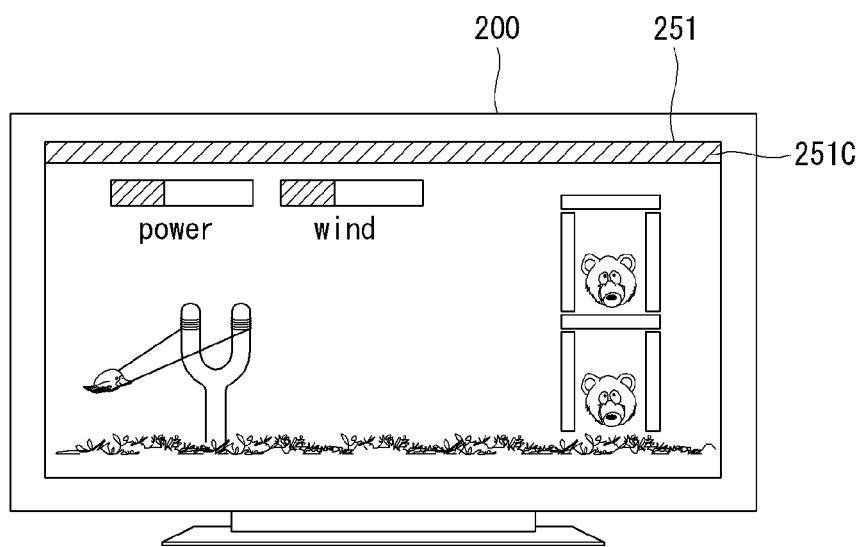

FIGS. 13 and 14 show examples where feedback, informing that a user's touch has been received, is output via a reference region 151D in accordance with the method shown in FIG. 7.

Referring to FIG. 13, when the user touches the reference region 151D of the touch screen 151, the controller 180 of the mobile terminal 100 controls the haptic module 154 of the output unit 150 of the mobile terminal 100 such that the haptic module generates vibration. The feedback output from the mobile terminal 100 may be sound or an image in addition to the vibration as described above.

When the user touches the reference region 151D of the touch screen 151, the controller 180 controls the display device 200 such that the display device 200 outputs a specific image 251C, as shown in FIG. 14. A feedback output from the display device 200 may be vibration or sound in addition to the image, as described herein.

FIG. 15 shows examples where a reference region 151S and control regions 151O to 151R are displayed by the touch screen 151 in accordance with the method shown in FIG. 7. Referring to FIG. 15(a), when the output extension function is activated, the controller 180 of the mobile terminal 100 may overlap the regions 151O to 151S with the execution screen of a specific application and display them. The regions 151O to 151S may be transparent or translucent.

Referring to FIG. 15(b), when the output extension function is activated, the controller 180 may not display the execution screen of the specific application on the touch screen 151. Instead, the controller 180 may display only specific regions 151O to 151S on the touch screen 151.

Figure 16:
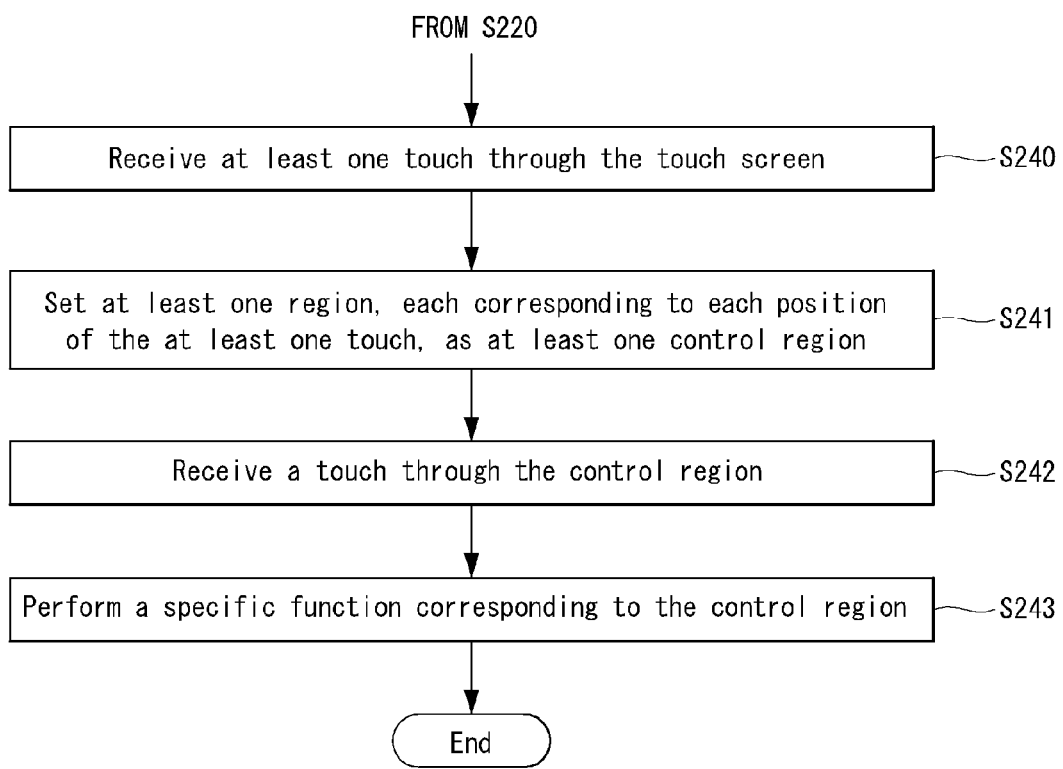
FIG. 16 is a flowchart illustrating a method of the mobile terminal executing an application according to yet another embodiment of the present invention.

FIG. 16 is a flowchart illustrating a method of the mobile terminal 100 executing an application according to yet another embodiment of the present invention. The method of the mobile terminal 100 executing an application is below with reference to relevant drawings.

When the output extension function is activated, a function previously set and related to a specific application being executed is deactivated and at least one touch is then received via the touch screen 151 at step S240.

In response, at step S241, the controller 180 may set at least one region, each region corresponding to each position of the at least one touch, as at least one control region. A specific function of the specific application corresponding to the control region may be previously set. A user may change the specific function of the specific application, which was previously set according to the control region, before the output extension function is activated.

Next, when a touch is received via the control region at step S242, the controller 180 performs the specific function corresponding to the control region at step S243 and outputs a result of the execution of the specific function via the display module 155.

Figure 17:
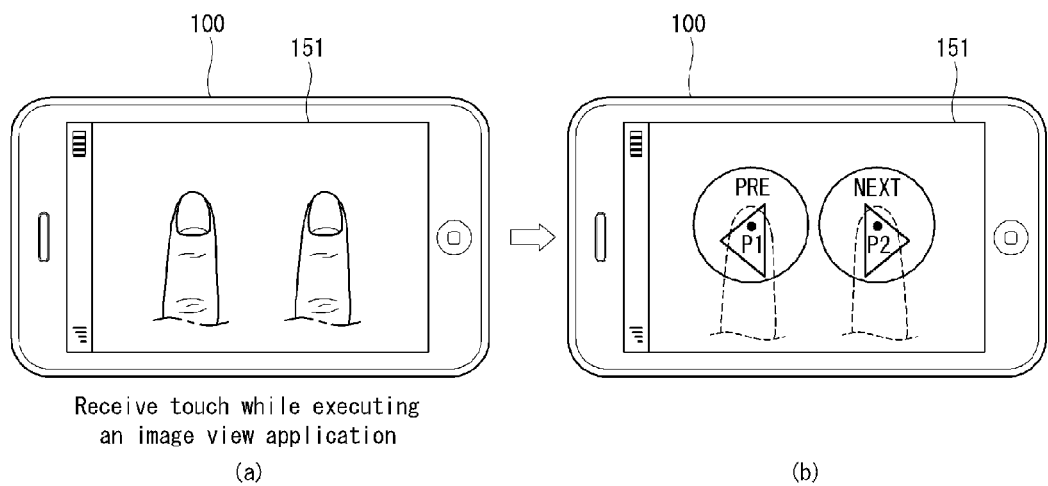
FIG. 17 shows an example where control regions corresponding to specific functions of a specific application being executed are set in accordance with the method shown in FIG. 16.

FIG. 17 shows an example where control regions corresponding to specific functions of a specific application being executed are set in accordance with the method shown in FIG. 16.

FIG. 17(a) shows a user's touch or touches being received via the touch screen 151 when the output extension function is activated while an image view application is executed in the mobile terminal 100. When the touch or touches are received, the controller 180 of the mobile terminal 100 sets a button region 'PRE' that corresponds to position P1 for displaying a previous image and a button region 'NEXT' that corresponds to position P2 for displaying a next image where the respective touches are received as shown in FIG. 17(b).

In other words, since button regions corresponding to specific functions are set based on positions touched by a user, the user does not need to previously recognize the positions of the button regions. Accordingly, the user may set the button regions 'PRE' and 'NEXT' by touching the touch screen 151 while seeing an image displayed by the display device 200 and may switch a displayed image to a previous image or a next image.

According to the example of FIG. 17, the controller 180 may not additionally set a reference region for distinguishing control regions from each other because the control regions are set on the touch screen 151 based on positions where touches are received.

Figure 18:
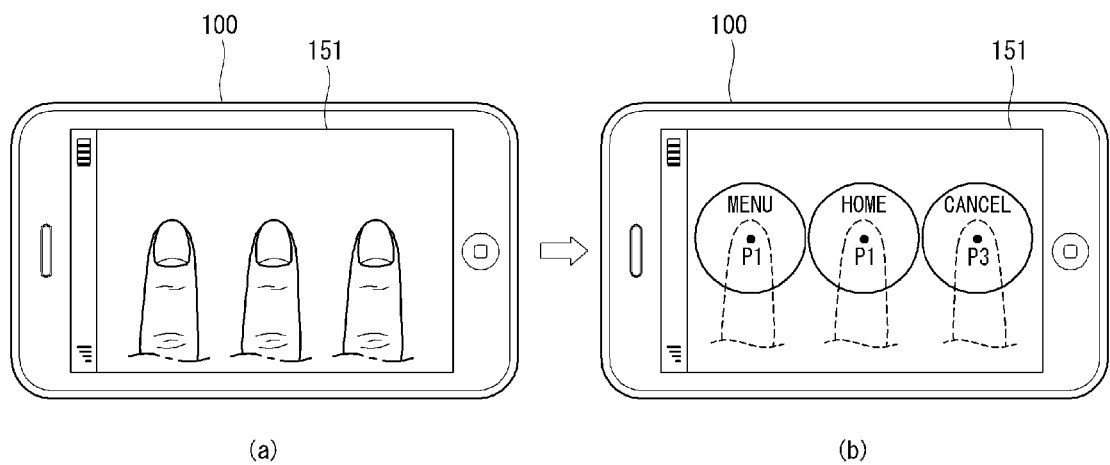
FIG. 18 shows another example where control regions corresponding to specific functions of a specific application being executed are set in accordance with the method shown in FIG. 16.

FIG. 18 shows another example where control regions corresponding to specific functions of a specific application being executed are set in accordance with the method shown in FIG. 16.

FIG. 18(a) shows a user's touch or touches are received via the touch screen 151 when the output extension function is activated while a specific application is being executed in the mobile terminal 100. When the touch or touches are received, the controller 180 of the mobile terminal 100 sets a menu button region 'MENU' corresponding to position P1, a home button region 'HOME' corresponding to position P2, and a cancel button region 'CANCEL' corresponding to position P3 where the respective touches are received as shown in FIG. 18(b).

Since button regions corresponding to specific functions are set based on positions touched by a user, as shown in the example of FIG. 18, the user does not need to previously recognize the positions of the button regions, and the controller 180 may not additionally set a reference region for distinguishing the control regions from each other.

Although control regions set based on a user's touches are illustrated to be displayed in the touch screen 151 in FIGS. 17 and 18, the controller 180 may not display the control regions on the touch screen 151.

Figure 19:
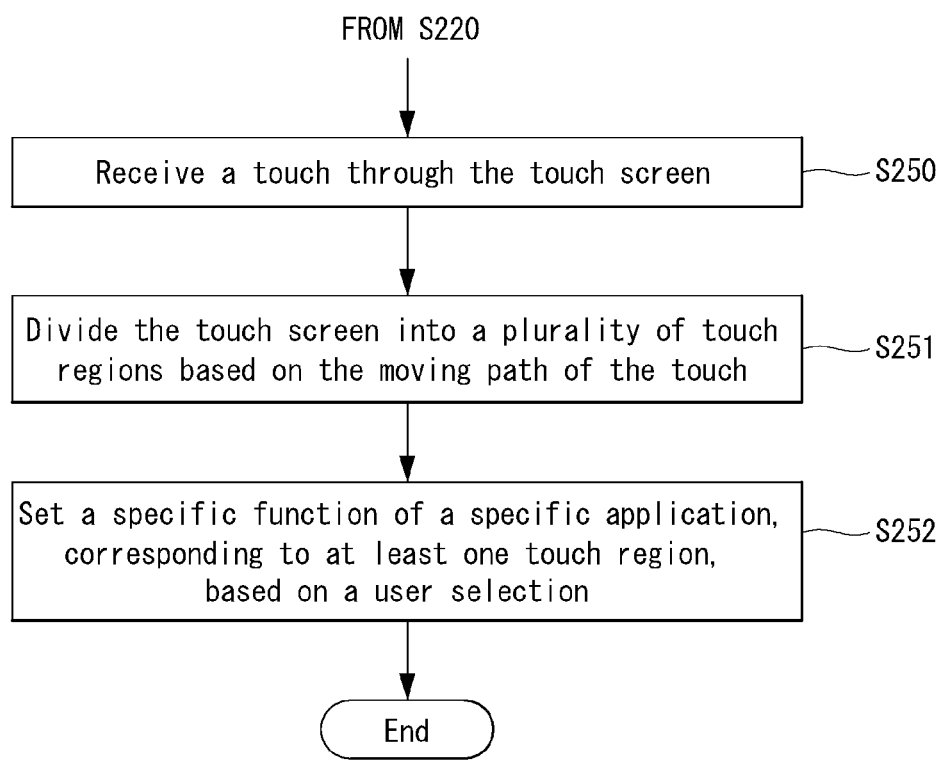
FIG. 19 is a flowchart illustrating a method of the mobile terminal executing an application according to yet another embodiment of the present invention.

FIG. 19 is a flowchart illustrating a method of the mobile terminal 100 executing an application according to another embodiment of the present invention. The method of the mobile terminal 100 executing an application is described with reference to relevant drawings.

When the output extension function is activated, a function previously set and related to a specific application being executed is deactivated and at least one touch is then received via the touch screen 151 at step S250.

In response, the controller 180 divides the touch screen 151 into a plurality of touch regions based on the moving path of the touch at step S251. Next, the controller 180 sets a specific function of the specific application, which corresponds to at least one of the plurality of touch regions, based on a user selection at step S252. According to an implementation the present invention, the specific function corresponding to the at least one touch region may be previously set. In some embodiments, the specific function corresponding to the at least one touch region may be changed by a user selection before the output extension function is activated.

Figure 20:
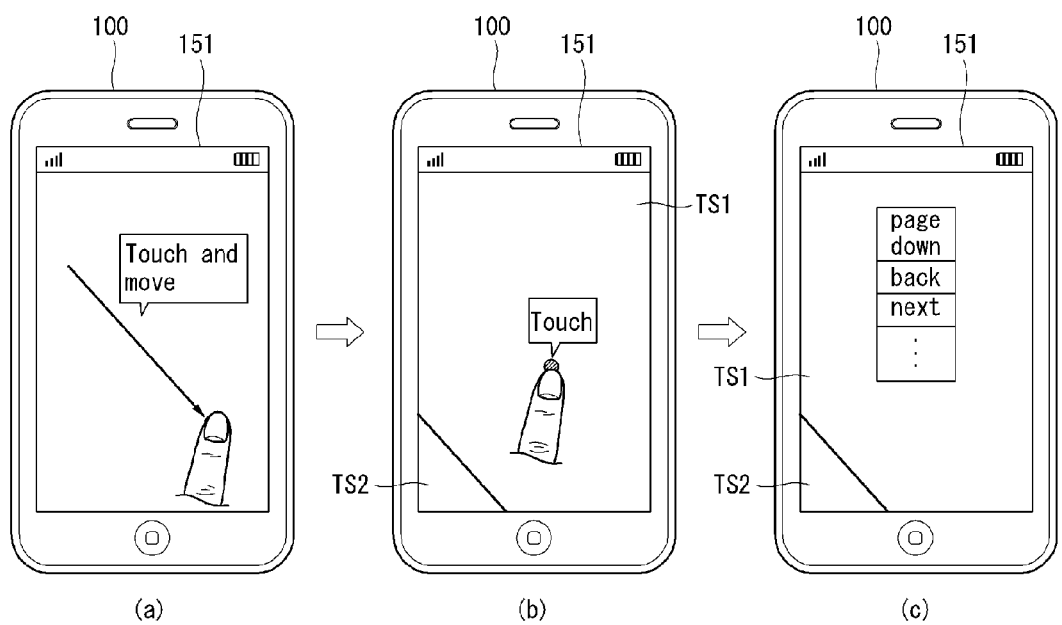
FIGS. 20 and 21 show examples where control regions corresponding to specific functions of a specific application being executed are set in accordance with the method shown in FIG. 19.
Figure 21:
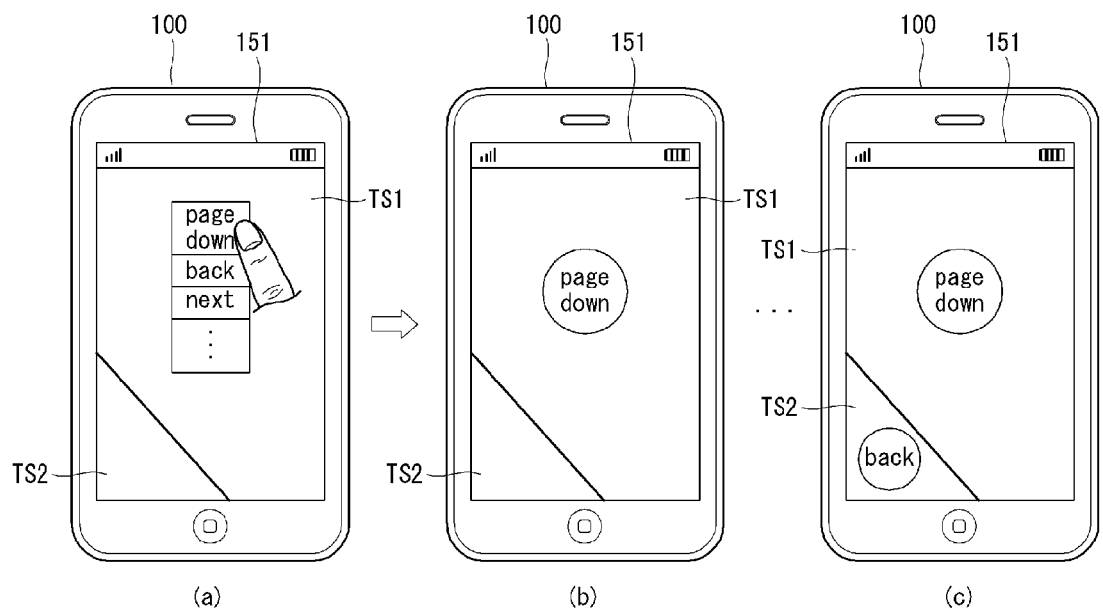

FIGS. 20 and 21 show examples where control regions corresponding to specific functions of a specific application being executed are set in accordance with the method shown in FIG. 19.

FIG. 20(a) shows that, when the output extension function is activated while a web browsing application is executed, a user's touch is received and moved in the state where a previously set function related to a web browsing application has been deactivated.

When a user's touch is moved as shown in FIG. 20(a), the controller 180 divides the touch screen 151 into a first touch region TS1 and a second touch region TS2 along the moving path of the touch, as shown in FIG. 20(b).

Next, when a user's touch is generated in the first touch region TS1, as shown in FIG. 20(b), the controller 180 displays a list of specific functions of the web browsing application an the touch screen 151, as shown in FIG. 20(c).

FIG. 21(a) shows that, in the state of FIG. 20(b), the user touches a 'page-down' function in the list of the specific functions of the web browsing application displayed on the touch screen 151 of the web browsing application. In response, the controller 180 sets the first touch region TS1 as a control region corresponding to the 'page-down' function, as shown in FIG. 21(b).

FIG. 21(c) shows that the second touch region TS2 is set as a control region corresponding to a 'back' function of the web browsing application, similar to the control region setting process described with reference to FIGS. 20(a) to 21(b).

In one example, as shown in FIGS. 19 to 21, after the output extension function of the mobile terminal 100 is activated, the touch screen 151 is divided into a plurality of touch regions based on the moving path of a touch on the touch screen 151, and a specific function of a specific application is selected based on a selected one of the plurality of touch regions.

Meanwhile, in another embodiment, before the output extension function is activated, a user may divide the touch screen 151 into a plurality of regions based on the moving path of a touch on the touch screen 151 and set specific functions of a specific application corresponding to the plurality of regions.

Figure 22:
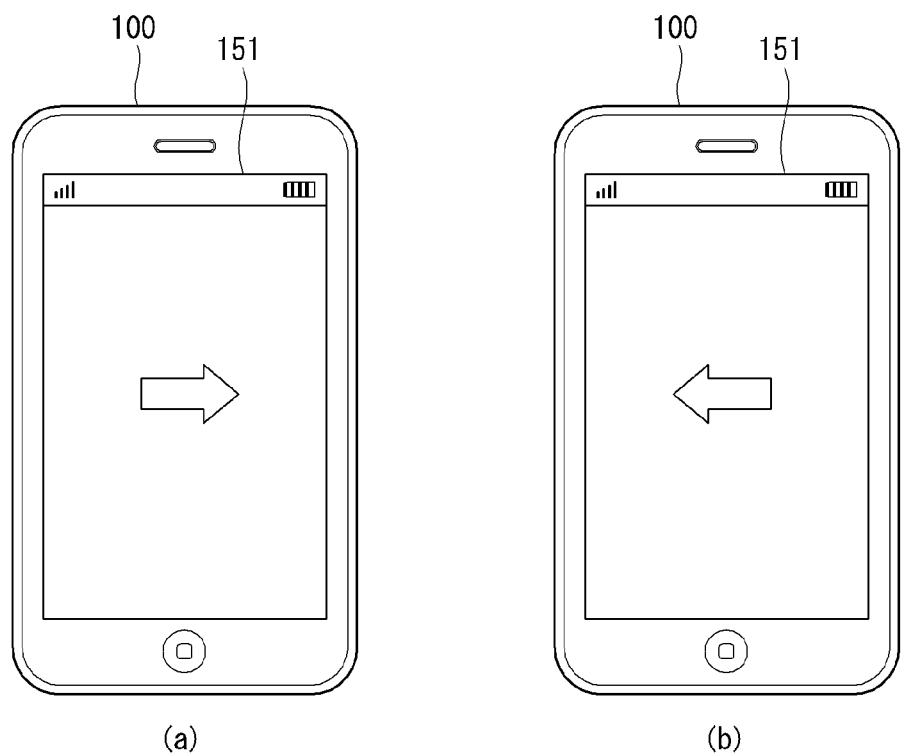
FIGS. 22 and 23 show examples where a specific function is executed according to the direction of a touch received via the touch screen, where the touch screen is set as a control region corresponding to the specific function of a specific application being executed.
Figure 23:
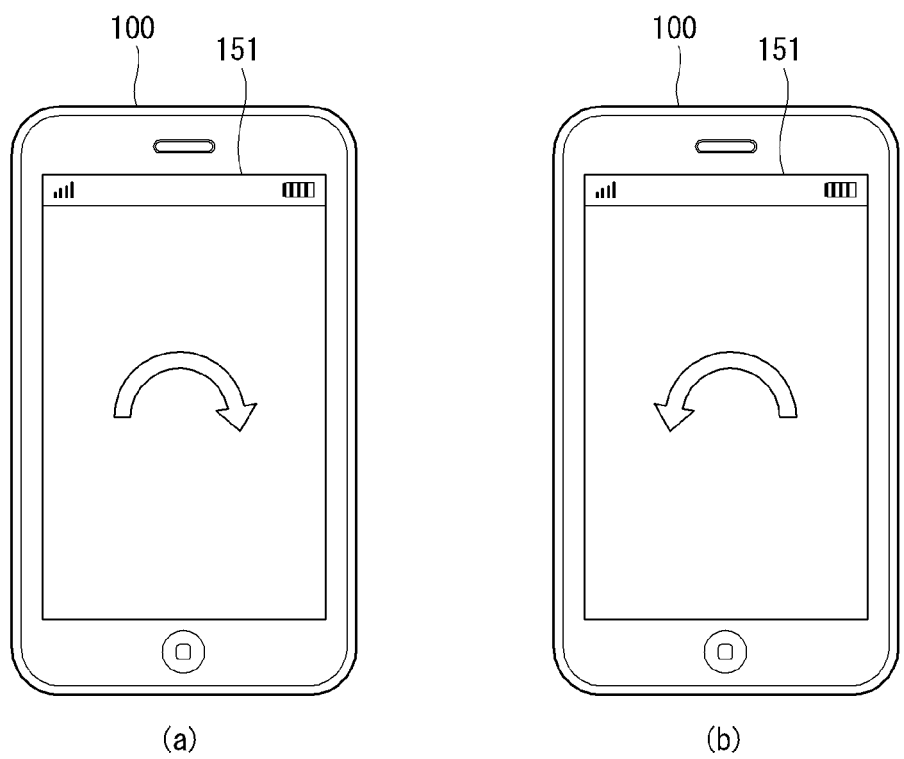

FIGS. 22 and 23 show examples where a specific function is executed according to the direction of a touch received via the touch screen 151 in the state where the touch screen has been set as a control region corresponding to the specific function of a specific application being executed.

In the state where the touch screen 151 has been set as the control region, when a touch directed toward the right is received via the touch screen 151, in FIG. 22(a), a touch directed toward the left is received via the touch screen 151, in FIG. 22(b).

It is assumed that the specific application is a television application or a radio application. In such a case, when a touch directed toward the right is received via the touch screen 151, the controller 180 of the mobile terminal 100 may change a current channel to a next channel or may increase the volume. A result of the execution of the controller 180 may be output via the display device 200 connected to the mobile terminal 100 over a communication network. If a touch directed toward the left is received via the touch screen 151, the controller 180 may change a current channel to a previous channel or may decrease the volume.

In the state where the touch screen 151 has been set as a control region, a touch in the shape of a circle and a clockwise rotation direction is received through the touch screen 151 in FIG. 23(a) and a touch in the shape of a circle and a counterclockwise rotation direction is received via the touch screen 151 in FIG. 23(b).

If the specific application is a television application or a radio application, when the touch in the shape of a circle and having a clockwise rotation direction is received via the touch screen 151, the controller 180 of the mobile terminal 100 may change a current channel to a next channel or may increase the volume. A result of the execution of the controller 180 may be output via the display device 200 connected to the mobile terminal 100 over a communication network. If the touch having a shape of a circle and a counterclockwise rotation direction is received via the touch screen 151, the controller 180 may change a current channel to a previous channel or may decrease the volume.

Although not shown in the drawings, a change in the rotation direction of the touch having a shape of a circle may be used to (1) enlarge or reduce the execution screen of the specific application, to (2) increase or decrease an output sound according to a result of the execution of the specific application, to (3) change the content of a content play application, or other function. However, these are only examples of an implementation of the present invention and the scope of the present invention is not limited thereto.

Figure 24:
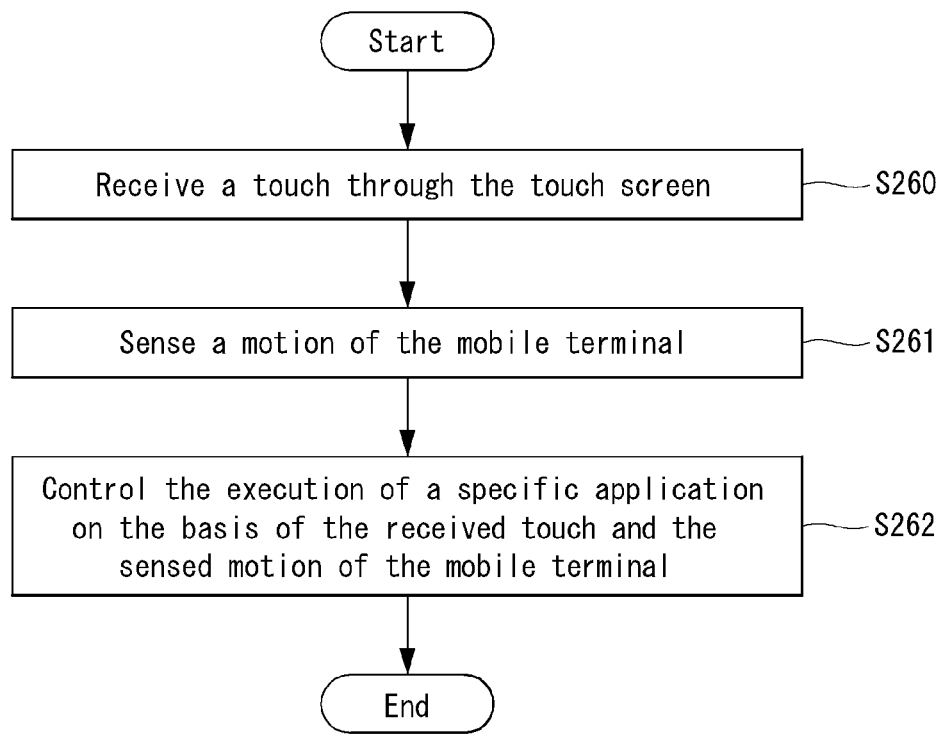
FIG. 24 is a flowchart illustrating a method of the mobile terminal executing an application according to yet another embodiment of the present invention.

FIG. 24 is a flowchart illustrating a method of the mobile terminal 100 executing an application according to another embodiment of the present invention. The method of the mobile terminal 100 executing an application is described with reference to relevant drawings.

In the state where the output extension function has been activated and the execution screen of a specific application displayed by the touch screen 151 of the mobile terminal 100 has been deactivated, a touch is received via a control region of the touch screen 151 at step S260. Next, the sensing unit 140 of the mobile terminal 100 senses motion of the mobile terminal 100 at step S261. The controller 180 controls the execution of the specific application on the basis of the received touch and the sensed motion of the mobile terminal 100 at step S262.

FIG. 25 shows an example where the method shown in FIG. 24 is executed. Referring to FIG. 25(a), the mobile terminal 100 is inclined to the right in the state where a control region has been touched. If an application being executed is a television watching application, the controller 180 of the mobile terminal 100 may move to the next channel in the television watching application or increase the volume.

Referring to FIG. 25(b), the mobile terminal 100 is inclined to the left in the state where a control region has been touched. If an application being executed is a television watching application, the controller 180 of the mobile terminal 100 may move to the previous channel in the television watching application or decrease the volume.

Figure 26:
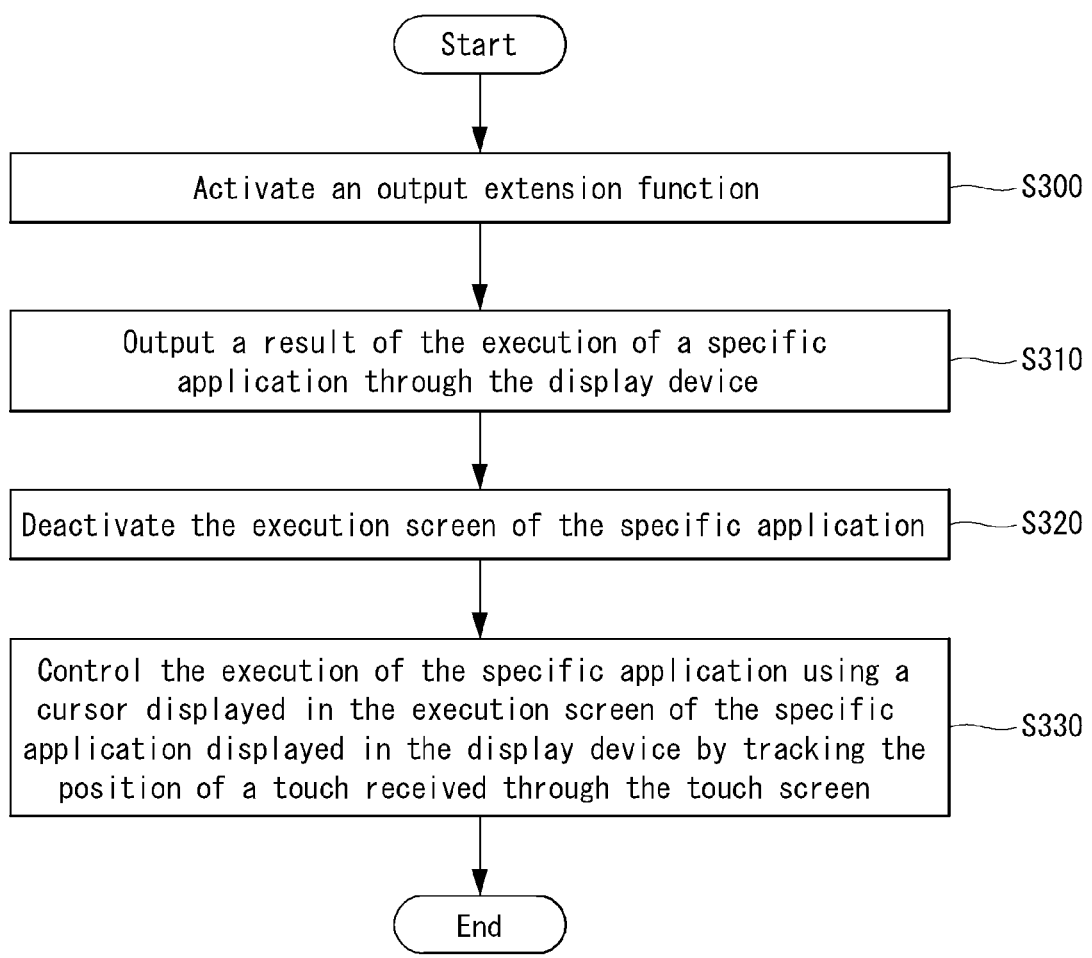
FIG. 26 is a flowchart illustrating a method of the mobile terminal executing an application according to yet another embodiment of the present invention.

FIG. 26 is a flowchart illustrating a method of the mobile terminal 100 executing an application according to another embodiment of the present invention. The method of the mobile terminal 100 executing an application is described with reference to relevant drawings.

Steps S300 to S330 of FIG. 26 may be the same as, or similar to, the steps S200 to S230 of FIG. 7. Therefore, further definition is not provided for steps S300 to S330.

When the output extension function is activated, the controller 180 of the mobile terminal 100 controls the execution of a specific application using a cursor displayed on the execution screen of the specific application displayed by the display device 200 by tracking the position of a touch received via the touch screen 151 at step S330.

When a touch is received via the touch screen 151 after the output extension function is activated, the controller 180 displays a cursor on the display device 200. A position where the cursor is displayed may be constant irrespective of a position where the touch is received on the touch screen 151.

In other words, the cursor may be always displayed at a predetermined position in the display device 200 irrespective of a position where the touch is received via the touch screen 151 after the output extension function is activated. In this case, a user does not need to take a position of the cursor into consideration when touching the touch screen 151.

FIGS. 27 and 28 show examples where a cursor is displayed in a predetermined region of the display device 200 connected to the mobile terminal 100 when a touch is received via the mobile terminal 100 according to the embodiment of the present invention.

FIG. 27 shows that two cursors are displayed by the display device 200 when two touches are received via the touch screen 151 after the output extension function is activated and while a specific application for requiring character entry is executed.

Referring to FIG. 27(*a*), the two touches are received via the touch screen 151 in the state where the output extension function has been activated. In response, the controller 180 displays cursors 251D and 251E at predetermined positions 'ㅇ' and 'ㅣ' of the keypad, as shown in FIG. 27(*b*). Furthermore, although touches are received via different positions from the positions shown in FIG. 27(*a*), the controller 180 may always display the cursors 251D and 251E at the positions 'ㅇ' and 'ㅣ' of the keypad.

FIG. 28 shows that a cursor is displayed by the display device 200 when a touch is received via the touch screen 151 after the output extension function is activated and while a game application for discharging a slingshot is executed.

Referring to FIG. 28(*a*), a touch is received via the touch screen 151 in the state where the output extension function has been activated. In response, the controller 180 displays a cursor 251F on an object loaded in the slingshot as shown in FIG. 28(*b*). Although a touch is received via a different position from the position shown in FIG. 28(*a*), the controller 180 may always display the cursor 251F on the object loaded in the slingshot. The cursor is illustrated to have a square with a specific area in FIGS. 27 and 28, but the shape of the cursor is not limited thereto.

Figure 29:
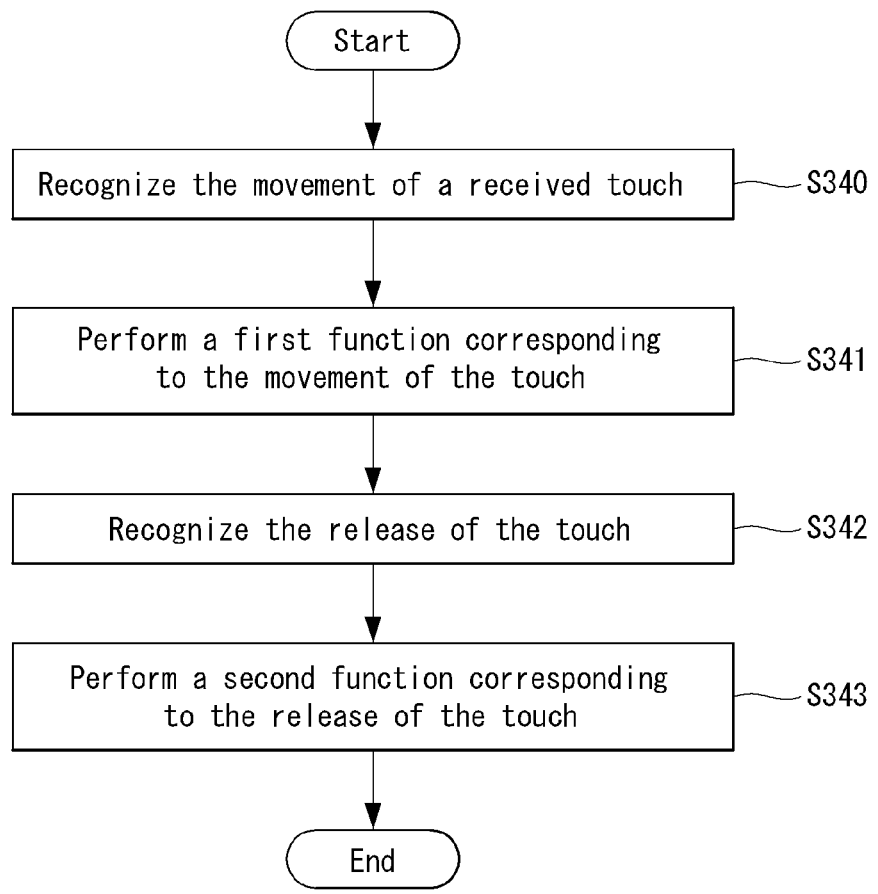
FIG. 29 is a flowchart illustrating a method of the mobile terminal executing an application according to yet another embodiment of the present invention.

FIG. 29 is a flowchart illustrating a method of the mobile terminal 100 executing an application according to another embodiment of the present invention. The method of the mobile terminal 100 executing an application is described with reference to relevant drawings.

When the output extension function is activated, a result of the execution of a specific application being executed in the mobile terminal 100 is output via the display device 200 connected to the mobile terminal 100. In the state where the execution screen of the specific application displayed by the touch screen 151 of the mobile terminal 100 has been deactivated, a touch is received via the touch screen 151 and subsequently moved. In response, the controller 180 recognizes the movement of the received touch at step S340 and performs a first function corresponding to the movement of the touch at step S341.

If the touch is moved to a specific position and then released, the controller 180 recognizes the release of the touch at step S342. In response, the controller 180 may perform a second function corresponding to the release of the touch at step S343. The first function and the second function may differ according to a specific application and may be previously set and stored.

Figure 30:
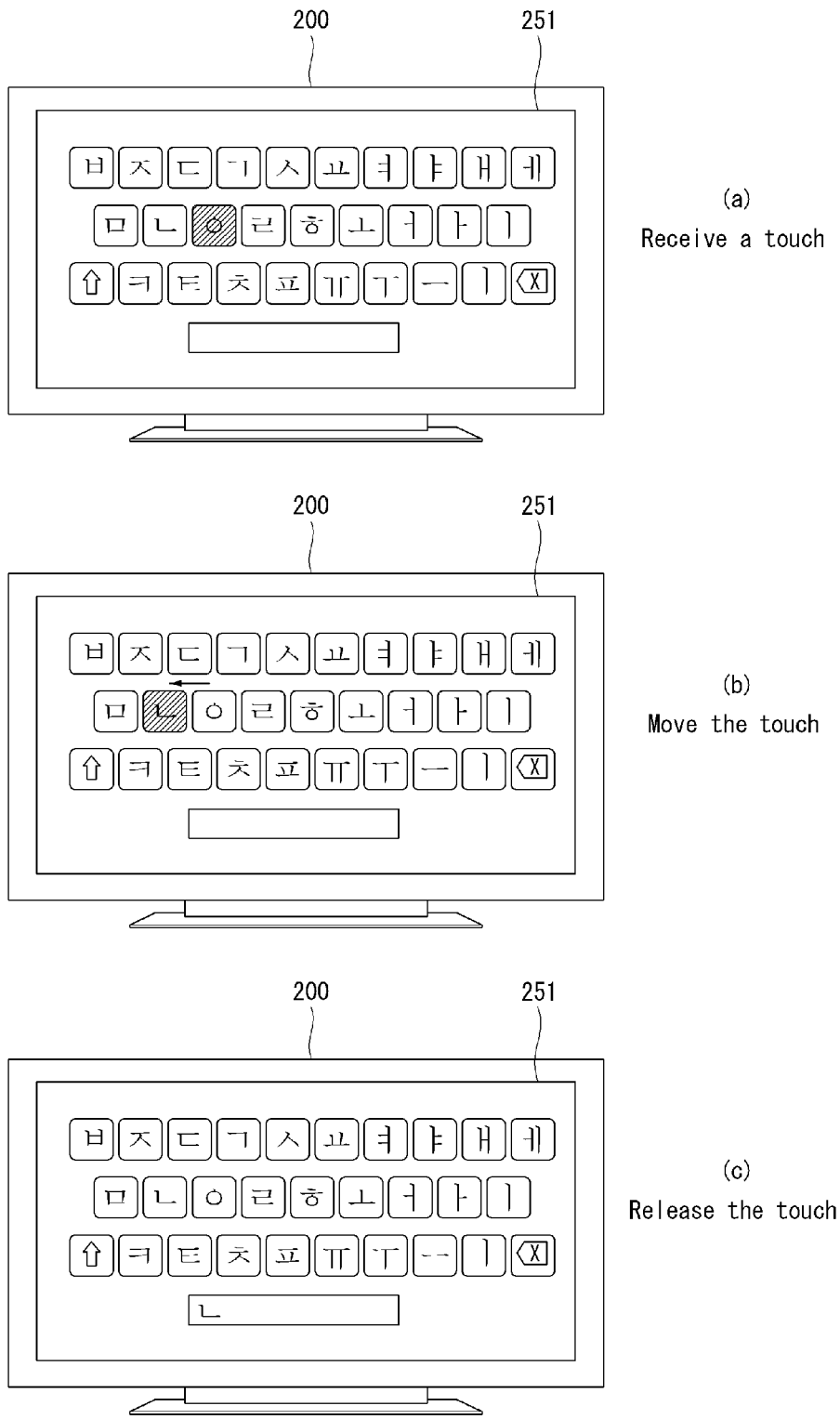
FIGS. 30 and 31 show examples of the execution of the method shown in FIG. 29.
Figure 31:
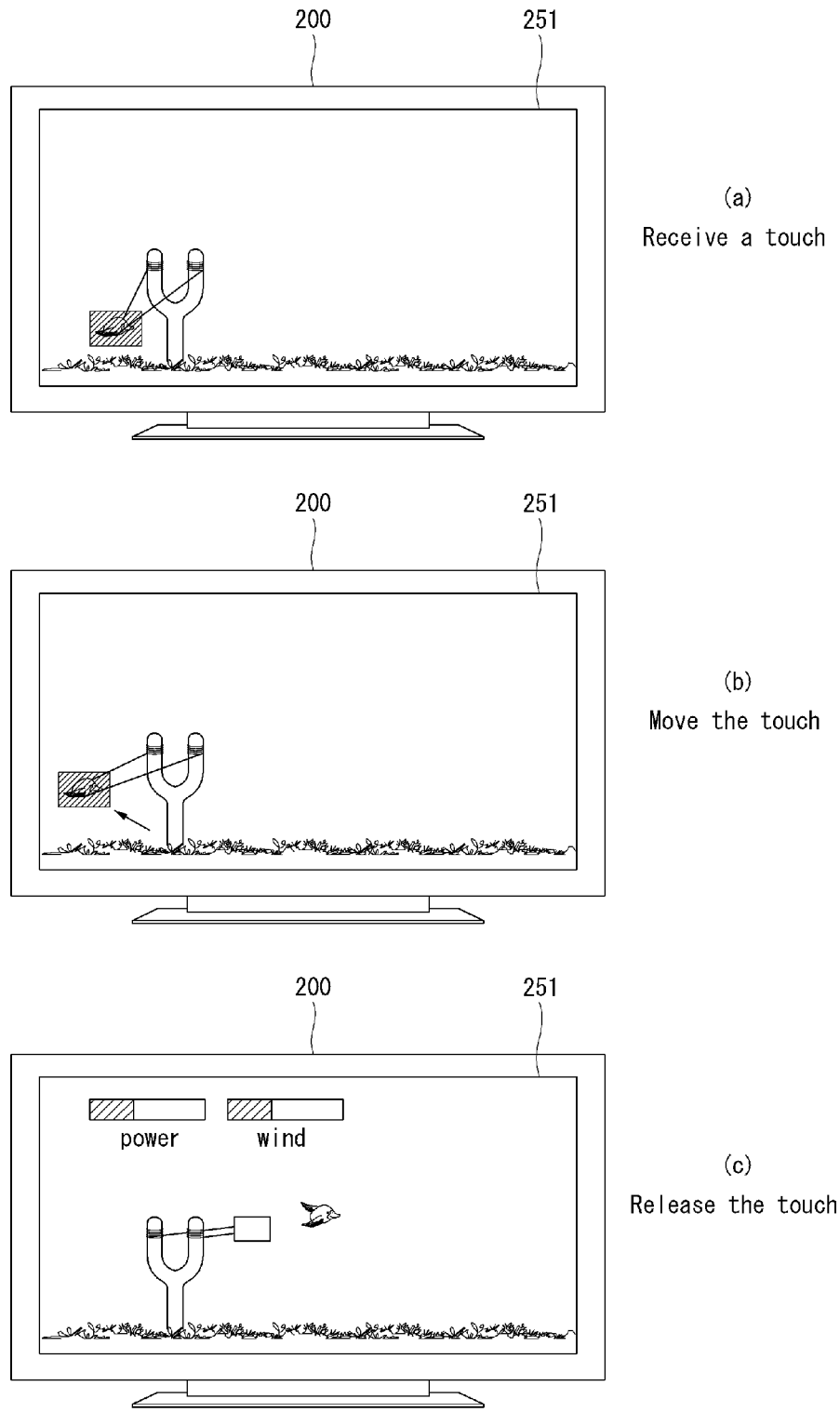

FIGS. 30 and 31 show examples where the method shown in FIG. 29 is executed. For reference, it is assumed that an application for requiring character entry is being executed in FIG. 30 and a game application for discharging a slingshot is being executed in FIG. 31.

The example of FIG. 30 will be described. When a touch is received via the touch screen 151 of the mobile terminal 100 in the state where the output extension function has been activated, the controller 180 displays a cursor at a predetermined position of the keypad 'ㅇ' displayed by the display device 200 connected to the mobile terminal 100 over a communication network, as shown in FIG. 30(*a*).

When the received touch is moved to the left any extent via the touch screen 151, the controller 180 moves the cursor by a distance corresponding to the amount of movement of the touch of the keypad displayed in the display device 200, as shown in FIG. 30(*b*). Accordingly, the cursor is displayed at a position 'ㄴ' of the keypad displayed by the display device 200. In other words, a first function corresponding to the movement of the touch in FIG. 30 is the movement of the cursor.

Next, the touch is released in the state where the cursor has been displayed at the position 'ㄴ' of the keypad displayed by the display device 200. In response, the controller 180 enters 'ㄴ' of the keypad at which the cursor is placed, as shown in FIG. 30(*c*). In other words, a second function corresponding to the release of the touch in FIG. 30 is the entry of a character corresponding to the position where the touch has been released.

In FIG. 31, when a touch is received via the touch screen 151 of the mobile terminal 100 in the state where the output extension function has been activated, the controller 180 displays a cursor on an object loaded in a slingshot on the execution screen of a game application which is displayed by the display device 200, as shown in FIG. 31(*a*).

When the received touch is moved to the left to some extent via the touch screen 151, the controller 180 pulls the slingshot on the left in the execution screen of the game application, as shown in FIG. 31(*b*). In other words, a first function corresponding to the movement of the touch in FIG. 31 is a function for pulling the slingshot.

Next, the touch is released in the state where the slingshot has been pulled. In response thereto, the controller 180 discharges the slingshot as shown in FIG. 31(*c*). In other words, a second function corresponding to the release of the touch in FIG. 31 is the discharge of the slingshot.

Figure 32:
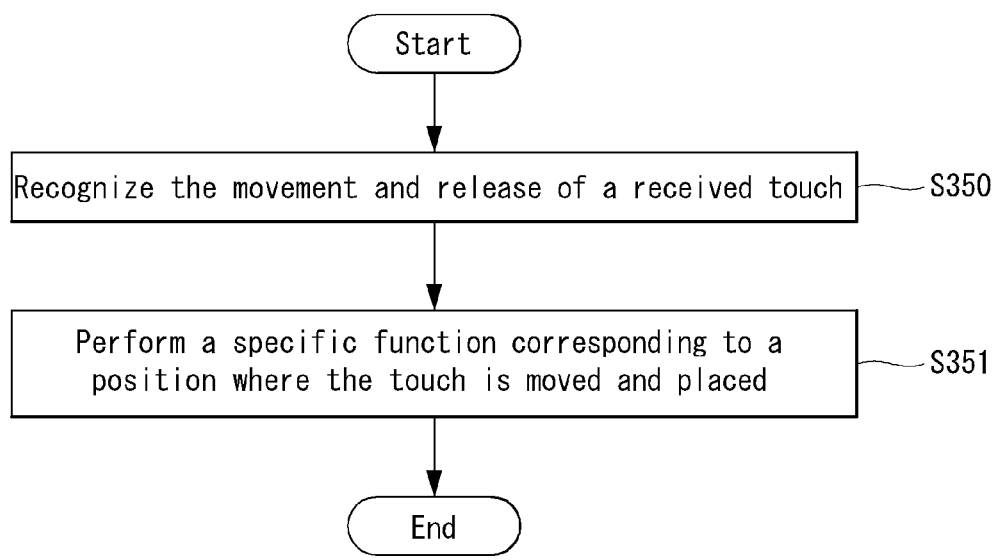
FIG. 32 is a flowchart illustrating a method of the mobile terminal executing an application according to yet another embodiment of the present invention.

FIG. 32 is a flowchart illustrating a method of the mobile terminal 100 executing an application according to another embodiment of the present invention. The method of the mobile terminal 100 executing an application is described with reference to relevant drawings.

When the output extension function is activated, a result of the execution of a specific application being executed in the mobile terminal 100 is output via the display device 200 connected to the mobile terminal 100. In the state where the execution screen of the specific application displayed by the touch screen 151 of the mobile terminal 100 has been deactivated, a touch is received via the touch screen 151 and then released. In response, the controller 180 recognizes the movement and release of the received touch at step S350 and performs a specific function corresponding to a position where the touch is moved and placed at step S351.

Figure 33:
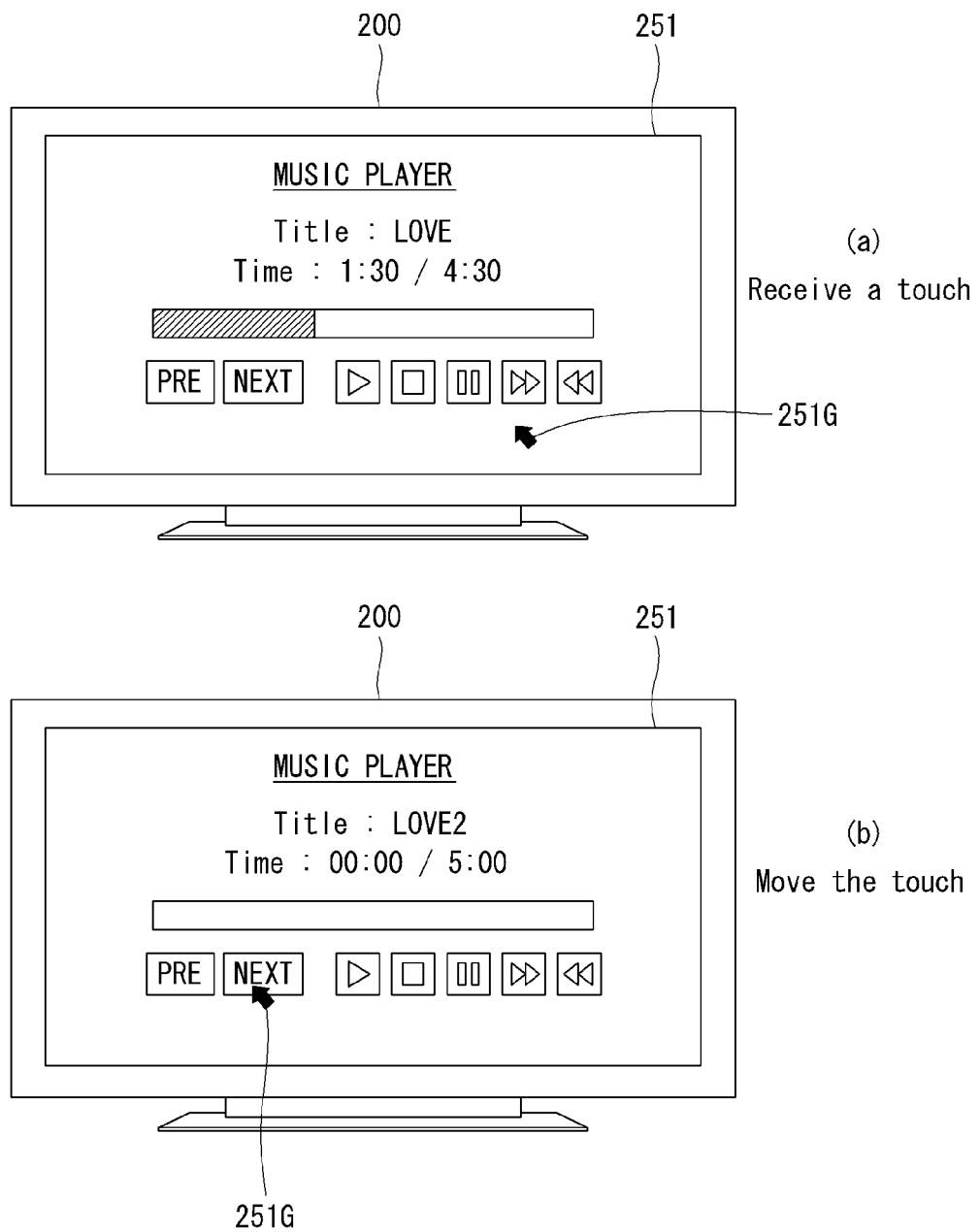
FIG. 33 shows an example of the execution of the method shown in FIG. 32.

FIG. 33 shows an example where the method shown in FIG. 32 is executed. For reference, a music play application is being executed in FIG. 33.

When a touch is received via the touch screen 151 of the mobile terminal 100 in the state where the output extension function has been activated, the controller 180 displays a cursor 251G at a predetermined position of the execution screen the music play application in the display device 200, as shown in FIG. 33(a).

When the received touch is moved via the touch screen 151, the controller 180 moves the cursor of the display device 200 to a button region 'NEXT' for selecting a next song and selects the next song as shown in FIG. 33(b).

Figure 34:
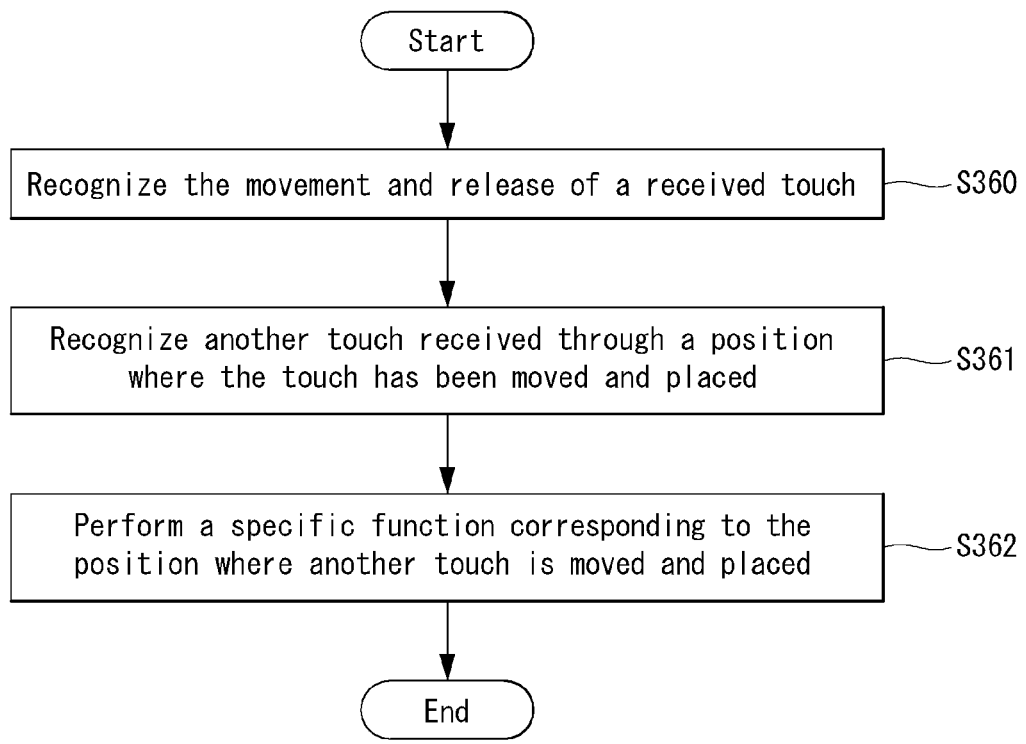
FIG. 34 is a flowchart illustrating a method of the mobile terminal executing an application according to yet another embodiment of the present invention.

FIG. 34 is a flowchart illustrating a method of the mobile terminal 100 executing an application according to another embodiment of the present invention. The method of the mobile terminal 100 executing an application is described with reference to relevant drawings.

When the output extension function is activated, a result of the execution of a specific application being executed in the mobile terminal 100 is output via the display device 200 connected to the mobile terminal 100. In the state where the execution screen of the specific application displayed by the touch screen 151 of the mobile terminal 100 has been deactivated, a touch is received via the touch screen 151 and then released. Next, another touch is received at a position where the touch has been released.

In response, the controller 180 recognizes the movement and release of the touch at step S360, recognizes that another touch is received at a position where the touch has been released at step S361, and performs a specific function corresponding to the position where the touch is moved and placed at step S362.

For example, if the application being executed is an application for requiring character entry and the touch is received, moved, and released and another touch is received at a position where the touch has been released, the controller 180 may enter a character corresponding to a position where the touch was moved and placed.

Figure 35:
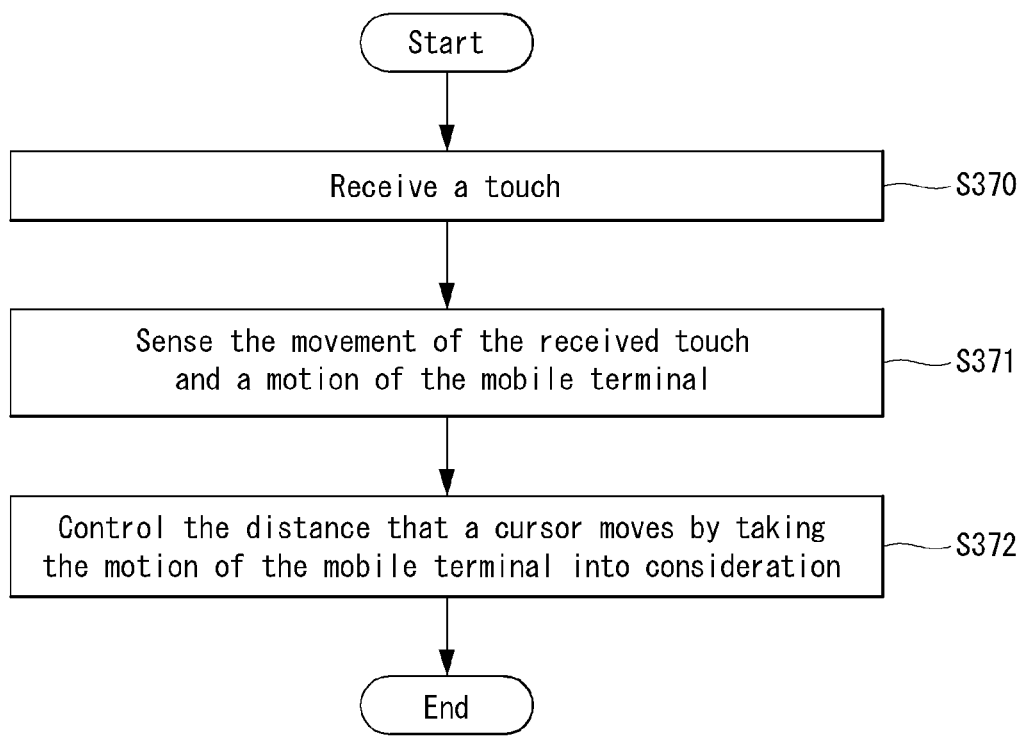
FIG. 35 is a flowchart illustrating a method of the mobile terminal executing an application according to yet another embodiment of the present invention.

FIG. 35 is a flowchart illustrating a method of the mobile terminal 100 executing an application according to another embodiment of the present invention. The method of the mobile terminal 100 executing an application is described with reference to relevant drawings.

When the output extension function is activated, a result of the execution of a specific application being executed in the mobile terminal 100 is output via the display device 200 connected to the mobile terminal 100. In the state where the execution screen of the specific application displayed by the touch screen 151 of the mobile terminal 100 has been deactivated, a touch is received via the touch screen 151 at step S370. In response, the controller 180 displays a cursor on the display device 200.

Next, the movement of the received touch is recognized and a motion of the mobile terminal 100 is sensed by the sensing unit 140 at step S371. In response, the controller 180 controls the distance that the cursor displayed by the display device 200 moves by taking the motion of the mobile terminal 100 into consideration at step S372. In other words, the controller 180 may vary the distance that a cursor moves according to the movement of a touch received in response to the sensed motion of the mobile terminal 100.

FIG. 36 shows an example where the distance that a cursor moves is controlled according the method shown in FIG. 35. Referring to FIG. 36(a), a user inclines the mobile terminal 100 to the right while moving a touch. The controller 180 of the mobile terminal 100 may increase the distance that a cursor displayed by the display device 200 moves according to the distance that the touch travels.

Referring to FIG. 36(a), a user inclines the mobile terminal 100 to the left while moving a touch. The controller 180 of the mobile terminal 100 may decrease the distance that a cursor displayed by the display device 200 moves according to the distance that the touch travels.

The examples where the distance that a cursor on the display device 200 travels may be controlled by movement of a touch and motion of the mobile terminal 100 have been described with reference to FIGS. 35 and 36. According to the present invention, the controller 180 may control the moving speed of a cursor displayed by the display device 200 according to the movement of a touch and a motion of the mobile terminal 100.

Figure 37:
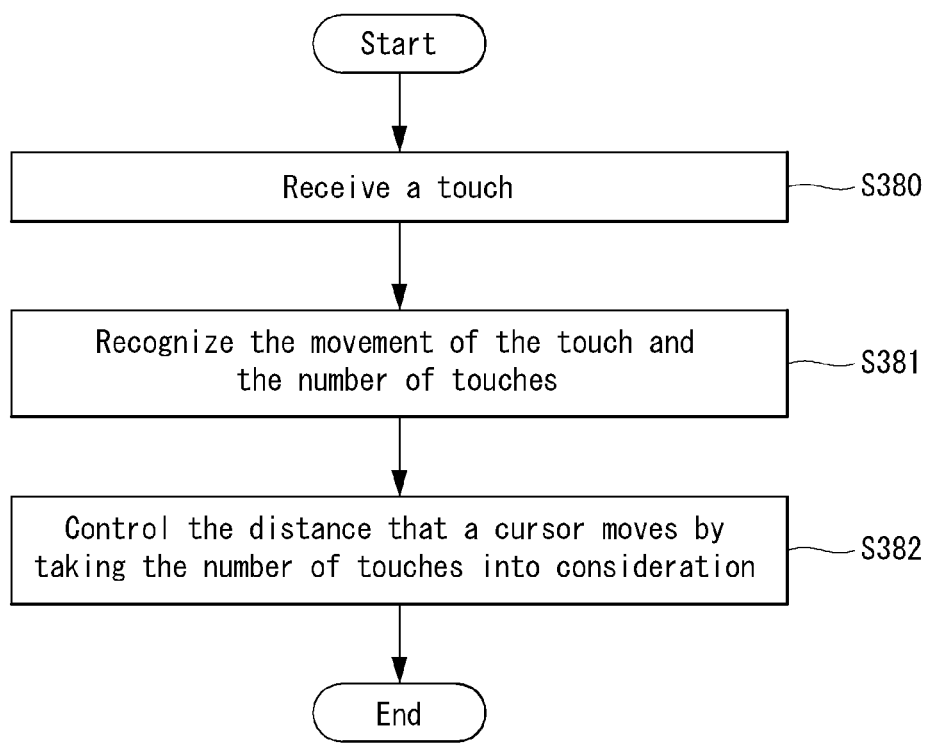
FIG. 37 is a flowchart illustrating a method of the mobile terminal executing an application according yet another embodiment of the present invention.

FIG. 37 is a flowchart illustrating a method of the mobile terminal 100 executing an application according to another embodiment of the present invention. The method of the mobile terminal 100 executing an application is described with reference to relevant drawings.

When the output extension function is activated, a result of the execution of a specific application being executed is output via the display device 200 connected to the mobile terminal 100. In the state where the execution screen of the specific application displayed on the touch screen 151 of the mobile terminal 100 has been deactivated, a touch is received via the touch screen 151 at step S380. In response, the controller 180 displays a cursor an the display device 200.

Next, the movement of the received touch is recognized and the number of touches is recognized at step S381. In response, the controller 180 controls the distance that the cursor travels by taking into consideration a quantified number of touches at step S382. In other words, the controller 180 may vary the distance that a cursor moves according to movement of a touch which is received in response to the number of recognized touches.

FIG. 38 shows an example where the distance that a cursor moves is controlled according the method shown in FIG. 37. FIG. 38(a) shows a user moving one touch. FIG. 38(b) shows a user moving two touches. In response to the movement, the controller 180 may set the distance that the cursor moves corresponding to the movement of the two touches.

Examples where the distance that a cursor moves may be controlled according to movement of a touch and the number of touches have been described with reference to FIGS. 37 and 38. According to the present invention, the controller 180 may control the moving speed of a cursor according to movement of a touch and the number of touches. According to the present invention, the controller 180 may control at least the distance that a cursor moves, which corresponds to movement of a touch and the moving speed of the cursor, based on the movement of the touch and the area of the touch.

Figure 39:
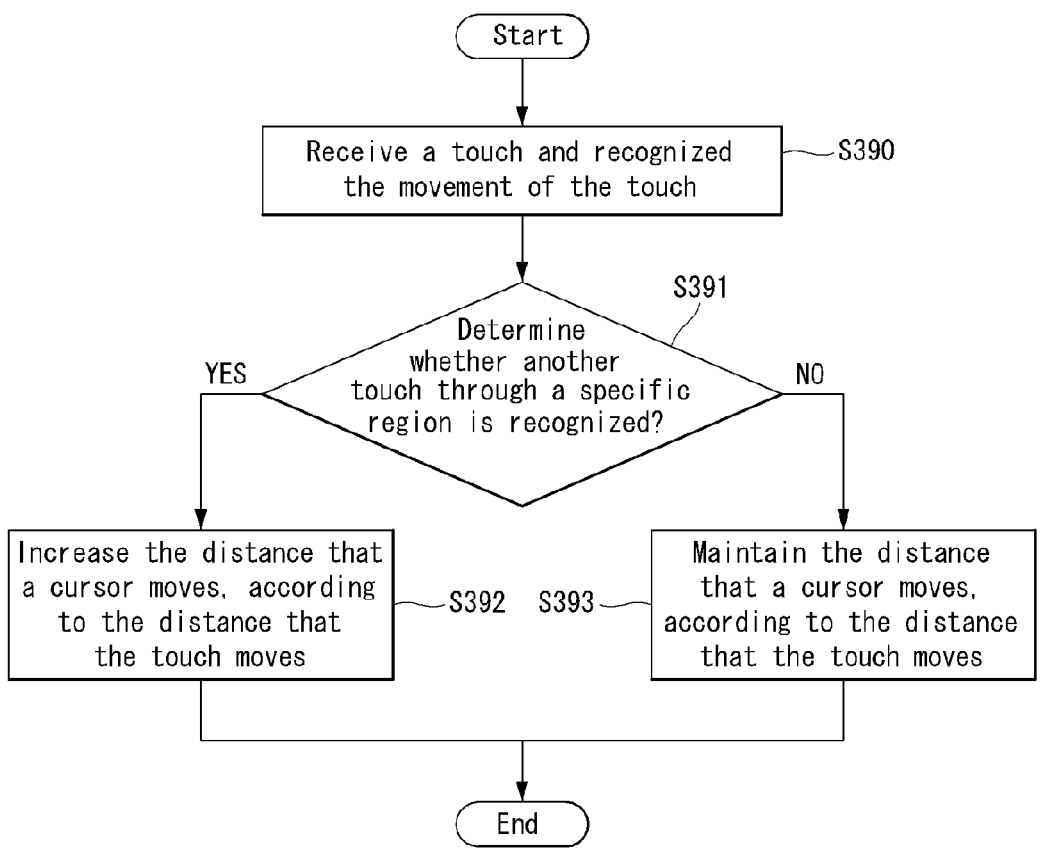
FIG. 39 is a flowchart illustrating a method of the mobile terminal executing an application according to yet another embodiment of the present invention.

FIG. 39 is a flowchart illustrating a method of the mobile terminal 100 executing an application according to another embodiment of the present invention. The method of the mobile terminal 100 executing an application is described with reference to relevant drawings.

When the output extension function is activated, a result of the execution of a specific application being executed in the mobile terminal 100 is output via the display device 200 connected to the mobile terminal 100. In the state where the execution screen has been deactivated, the controller 180 of the mobile terminal 100 recognizes that a touch is received via the touch screen 151 and then moved at step S390.

The controller 180 determines whether another touch via a specific region provided on the touch screen 151 is recognized at step S391. If another touch via the specific region is recognized, the controller 180 may increase the relative distance that a cursor moves, as indicated at step S392. In some embodiments, if another touch via the specific region is recognized, the controller 180 may decrease the relative distance that a cursor moves. If, however, another touch via the specific region is not recognized, the controller 180 maintains the distance that a cursor moves, as indicated at step S393.

Figure 40:
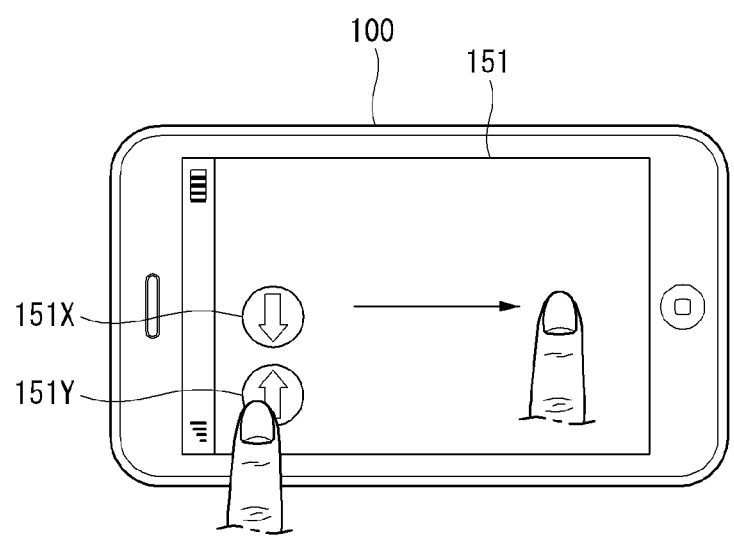
FIG. 40 shows an example where movement of the cursor is controlled according the method shown in FIG. 39.

FIG. 40 shows an example where the distance that a cursor moves is controlled according the method shown in FIG. 39. Referring to FIG. 40, a user moves a touch in the state where the user has touched a specific region 151Y. In response, the controller 180 of the mobile terminal 100 may increase the distance that a cursor moves based on the distance that the touch moves. However, if the user moves a touch in the state where the user has touched the other region 151X, the controller 180 may decrease the distance that a cursor moves based on the distance that the touch moves.

FIGS. 39 and 40 show examples where the distance that a cursor moves may be controlled according to movement of a touch and whether a specific region was touched. According to the present invention, the controller 180 may control the moving speed of a cursor according to movement of a touch and whether a specific region has been touched.

Figure 41:
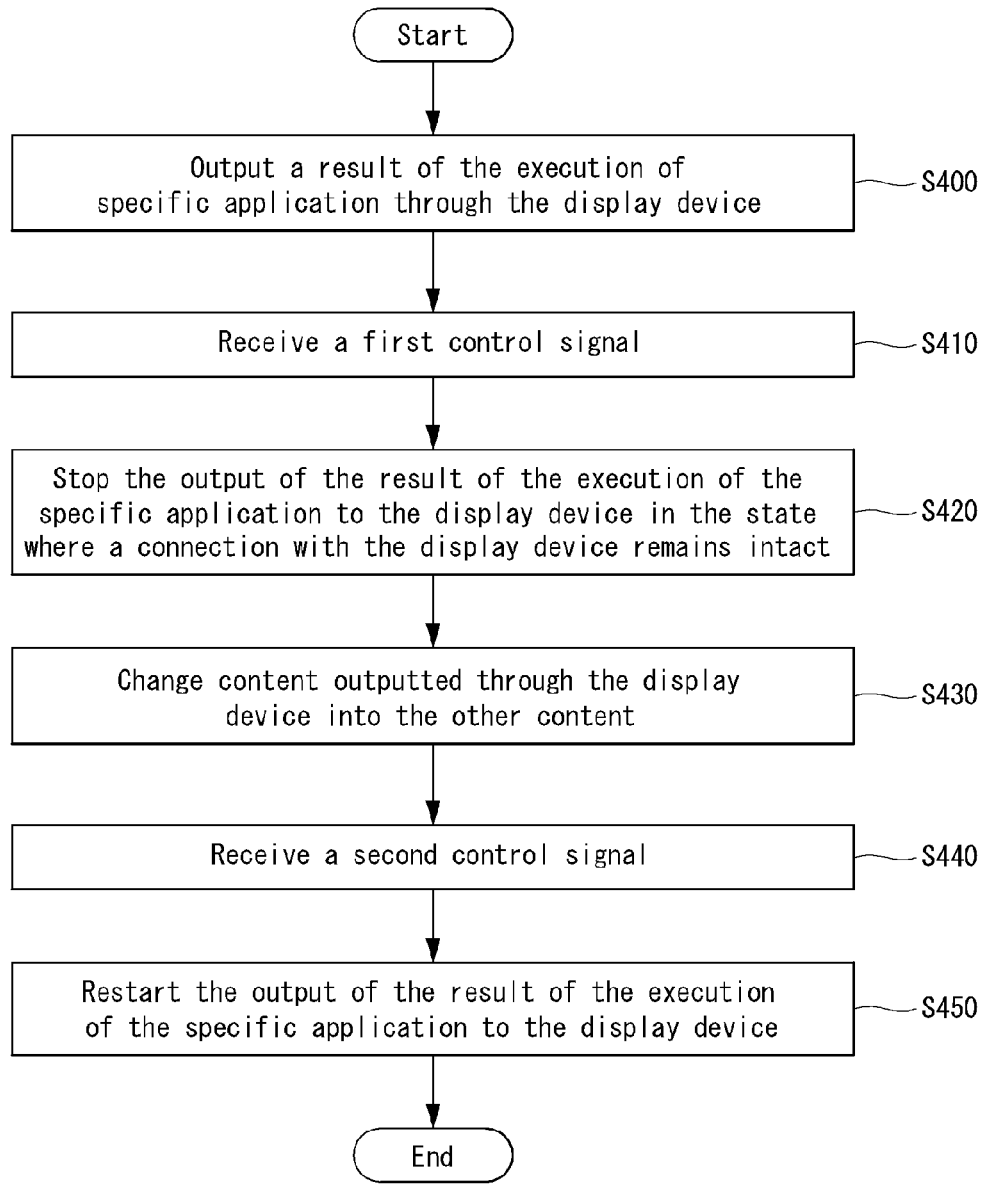
FIG. 41 is a flowchart illustrating a method of the mobile terminal executing an application according to yet another embodiment of the present invention.

FIG. 41 is a flowchart illustrating a method of the mobile terminal 100 executing an application according to another embodiment of the present invention.

The mobile terminal 100 is outputting a result of the execution of a specific application via the display device 200 at step S400. The controller 180 of the mobile terminal 100 receives a first control signal generated by a user manipulation at step S410.

In response to the first control signal, the controller 180 stops the output of the result of the execution of the specific application by the display device 200 in the state where a connection with the display device 200 remains intact at step S420 and controls the display device 200 such that the content output via the display device 200 is changed to the other content at step S430. Here, the other content may be a moving image, a broadcast image, or other image that is originally output from the display device 200.

While the other content is output via the display device 200, the controller 180 receives a second control signal generated by a user manipulation of the mobile terminal 100 at step S440. In response to the second control signal, the controller 180 restarts the output of the result of the execution of the specific application by the display device 200 at step S450.

Figure 42:
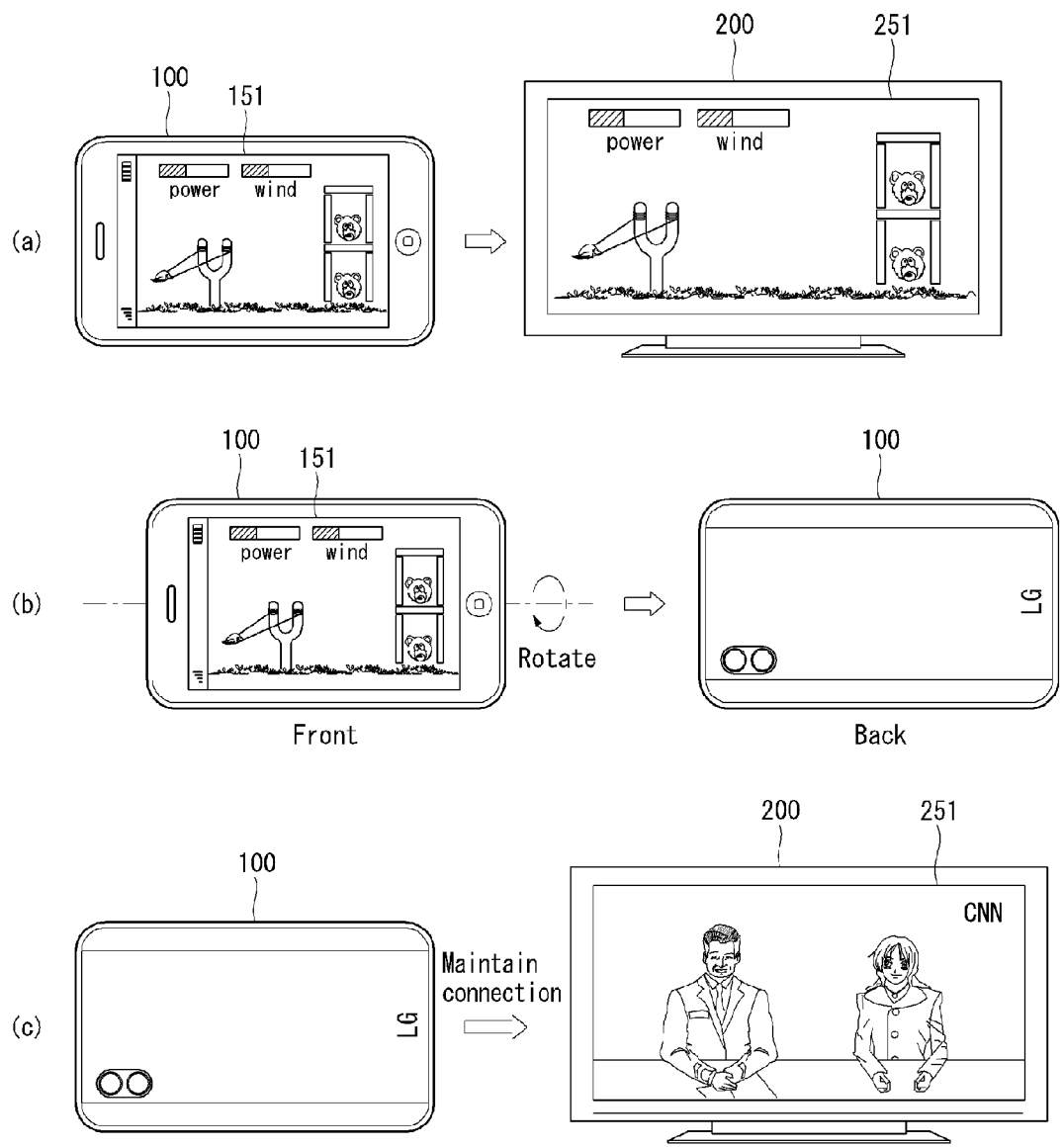
FIGS. 42 and 43 show a process in which content displayed by the display device is changed according to the method shown in FIG. 41.
Figure 43:
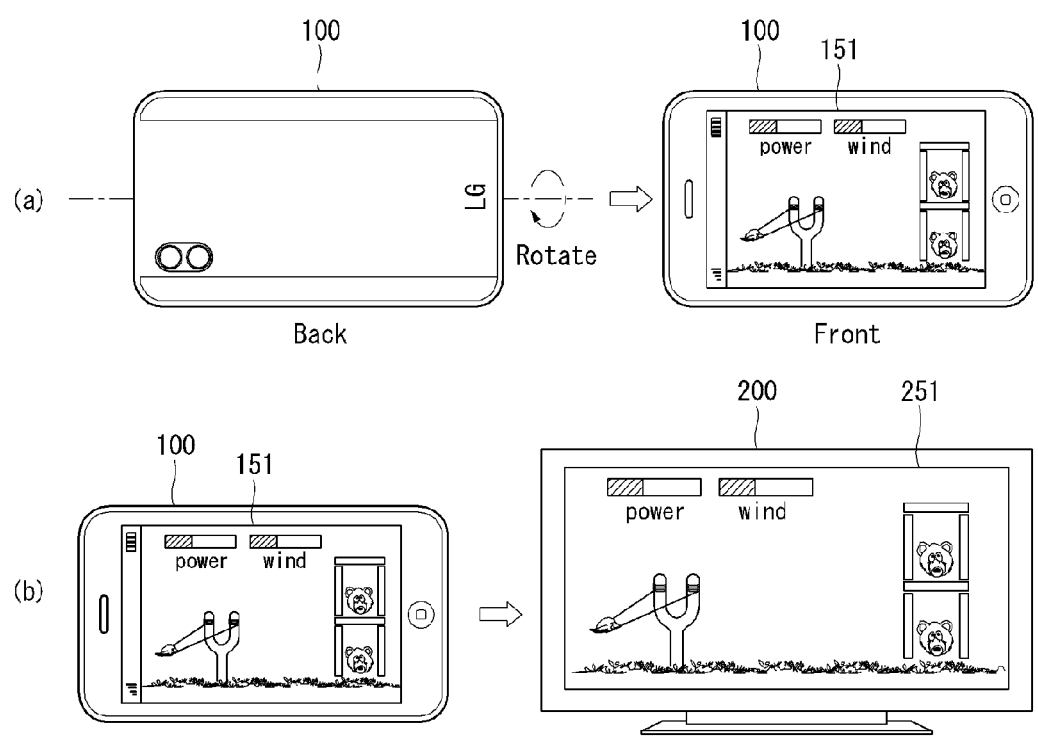

FIGS. 42 and 43 show a process by which content displayed in the display device 200 coupled to the mobile terminal 100 according to the present invention is changed according to the method shown in FIG. 41.

FIG. 42(*a*) shows that an execution screen of a specific game application executed in the mobile terminal 100 is output by the display device 200. In the state of FIG. 42(*a*), a user turns the mobile terminal 100 upside down by rotating the mobile terminal 100 as shown in FIG. 42(*b*). In response, the sensing unit 140 of the mobile terminal 100 detects that the mobile terminal 100 has been turned upside down by using an acceleration sensor, a gravity sensor, or a gyro sensor and generates a first control signal.

In response to the first control signal, the controller 180 of the mobile terminal 100 controls the display device 200 so that content output via the display device 200 is changed to broadcast content in the state where a connection with the display device 200 remains uninterrupted, as shown in FIG. 42(*c*).

While the display device 200 outputs the broadcast content, the user turns the mobile terminal 100 upside down to its original state, as shown in FIG. 43(*a*). In response, the sensing unit 140 detects that the mobile terminal 100 has been returned to its original state and generated a second control signal. In response to the second control signal, the controller 180 outputs the result of the execution of the specific game application being executed in the mobile terminal, as shown in FIG. 43(*b*).

In FIG. 43, the control signals are generated by the rotation of the mobile terminal 100, but the scope of the present invention is not limited thereto.

Figure 44:
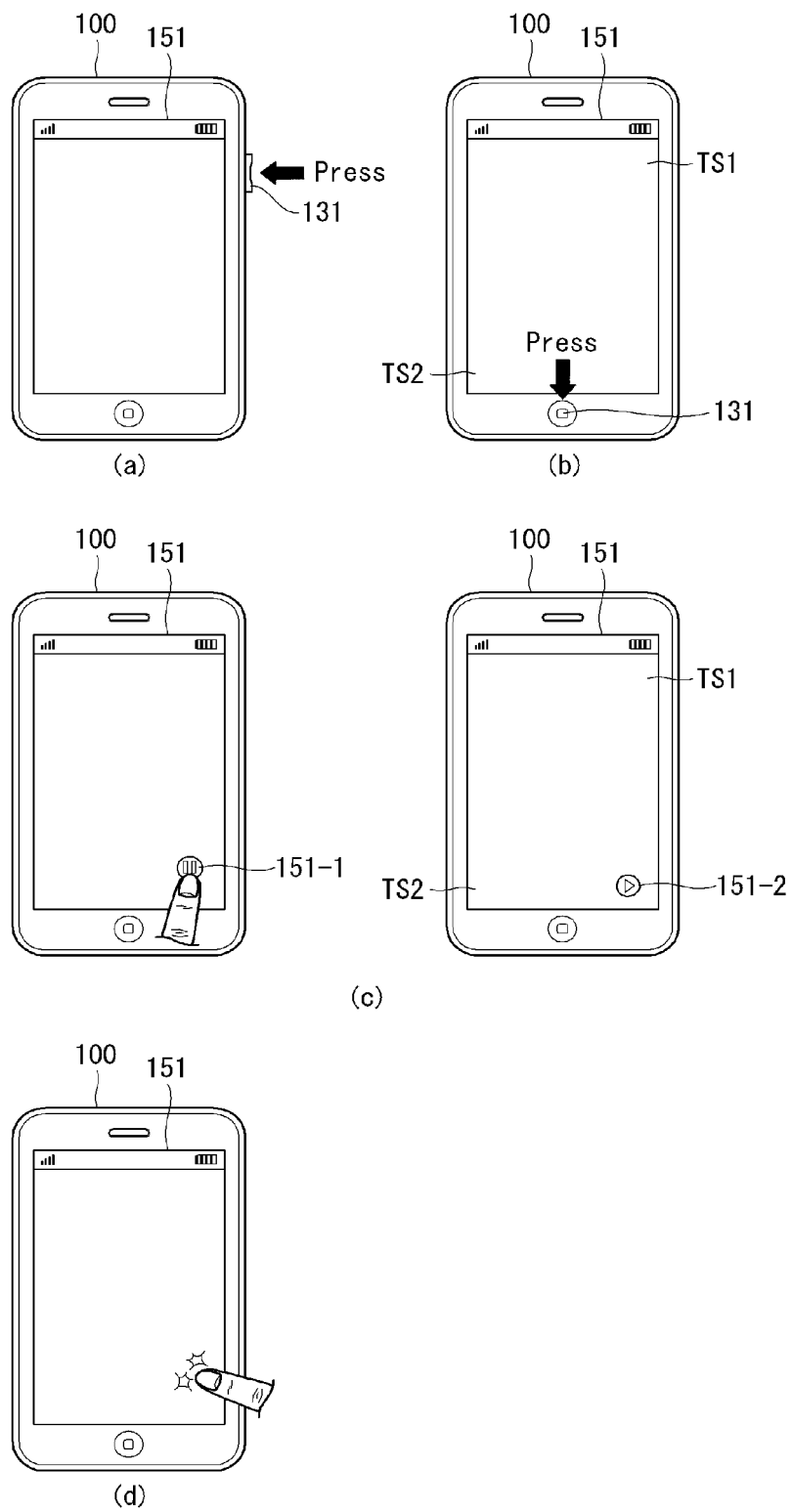
FIG. 44 shows examples of a method of generating control signals according to the method shown in FIG. 41.

FIG. 44 shows examples of a method of generating control signals according to the method shown in FIG. 41.

FIGS. 44(*a*) and 44(*b*) show that control signals may be generated when a user of the mobile terminal 100 presses the hardware button 131 provided in the mobile terminal 100. For example, when the user presses the button 131 once, the controller 180 of the mobile terminal 100 may stop the output of a result of the execution of the specific application by the display device 200. When the user presses the button 131 for a second time, the controller 180 of the mobile terminal 100 may restart the output of the result of the execution of the specific application.

FIG. 44(*c*) shows that a control signal may be generated when the user touches software keys 151-1 and 151-2, which can be displayed by the display module 155 formed by a touch screen. For example, when the user touches the first soft key 151-1, the controller 180 of the mobile terminal 100 may stop the output of a result of the execution of the specific application by the display device 200. When the user touches the second soft key 151-2, the controller 180 restarts the output of the result of the execution of the specific application.

FIG. 44(*d*) shows that a control signal may be generated when a user touches the mobile terminal 100 with a finger. A sensor included in the sensing unit 140 of the mobile terminal 100 may generate the control signal by detecting the amount of the impact. For example, when the user touches the mobile terminal 100 once, the controller 180 may stop the output of a result of the execution of the specific application by the display device 200. When the user touches the mobile terminal 100 again, the controller 180 may restart the output of the result of the execution of the specific application.

Figure 45:
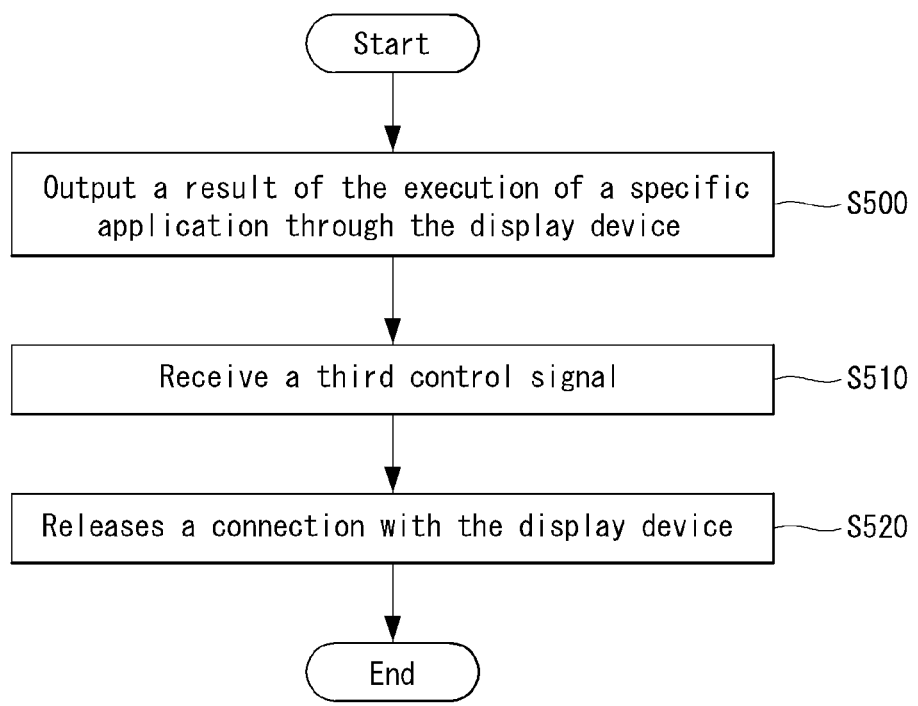
FIG. 45 is a flowchart illustrating a method of the mobile terminal executing an application according to yet another embodiment of the present invention.

FIG. 45 is a flowchart illustrating a method of the mobile terminal 100 executing an application according to another embodiment of the present invention.

The mobile terminal 100 is outputting a result of the execution of a specific application via the display device 200 at step S500. The controller 180 of the mobile terminal 100 receives a third control signal generated by a user manipulation at step S510. The third control signal may be generated in accordance with the method shown in FIGS. 43 and 44, but the scope of the present invention is not limited thereto.

When the third control signal is received, the controller 180 releases a connection with the display device 200 at step S520. The controller 180 may release the connection with the display device 200 and, at the same time, control the display device 200 so that the display device 200 outputs the other content. The other content may be content that had been originally output by the display device 200.

Figure 46:
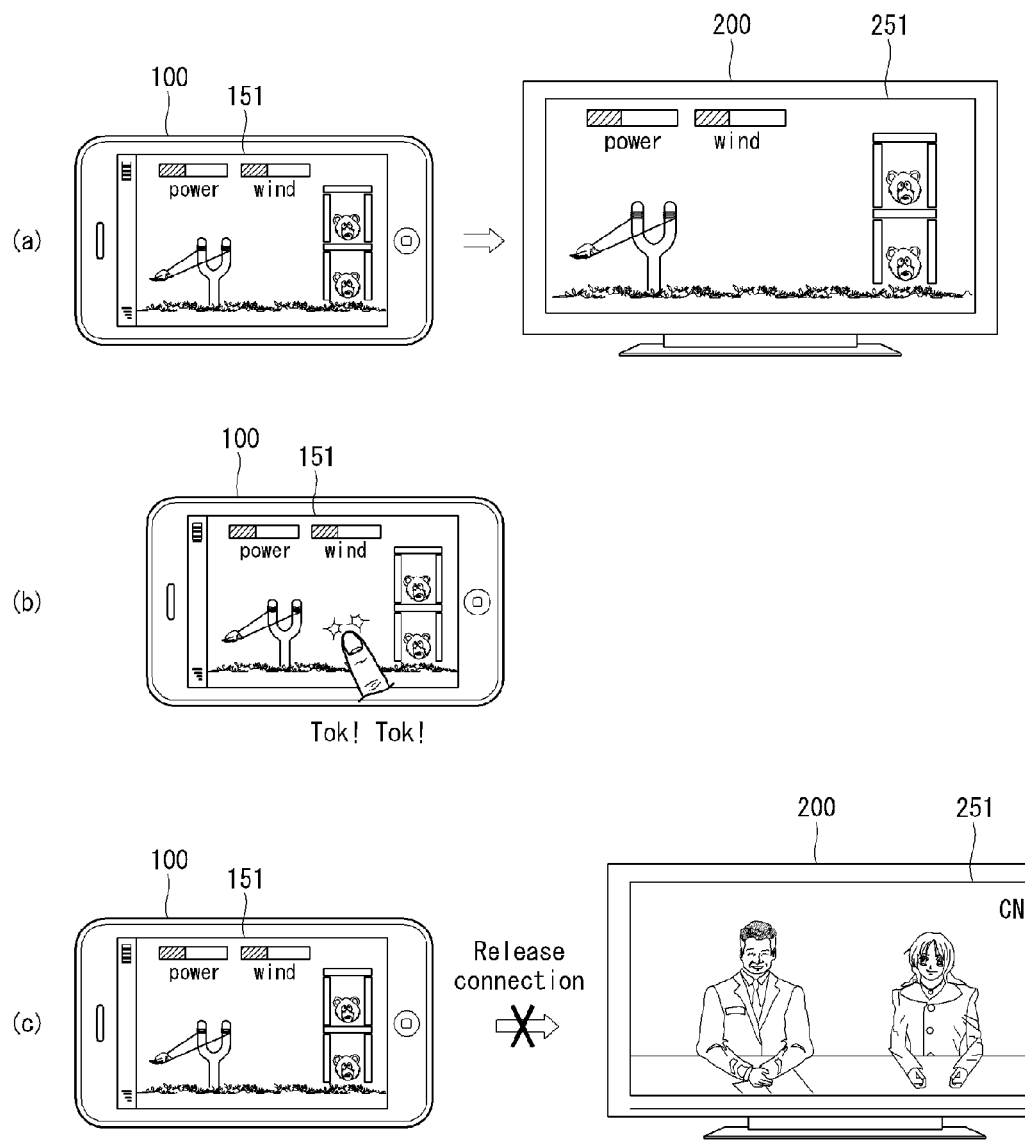
FIG. 46 shows a process of releasing a connection between the mobile terminal and the display device in accordance with the method shown in FIG. 41.

FIG. 46 shows a process of releasing a connection between the mobile terminal 100 and the display device 200 in accordance with the method of FIG. 41.

FIG. 46(*a*) shows the execution screen of a specific game application being executed in the mobile terminal 100 is output via the display device 200. In the state of FIG. 46(*a*), a user touches the mobile terminal 100 as shown in FIG. 46(*b*).

In response, the sensing unit 140 of the mobile terminal 100 generates a control signal by detecting the amount of the impact.

When the control signal is generated, the controller 180 of the mobile terminal 100 releases a connection with the display device 200 and controls the display device 200 so that content output via the display device 200 is changed to broadcast content, as shown in FIG. 46(*c*).

The above-described method of operating the mobile terminal may be written as computer programs and may be implemented in digital microprocessors that execute the programs using a computer readable recording medium. The method of controlling the mobile terminal may be executed via software. The software may include code segments that perform required tasks. Programs or code segments may also be stored in a processor readable medium or may be transmitted according to a computer data signal combined with a carrier via a transmission medium or communication network.

The computer readable recording medium may be any data storage device that can store data which can be thereafter read by a computer system. Examples of the computer readable recording medium may include read-only memory (ROM), random-access memory (RAM), CD-ROMs, DVD±ROM, DVD-RAM, magnetic tapes, floppy disks, and/or optical data storage devices. The computer readable recording medium may also be distributed over network coupled computer systems so that the computer readable code is stored and executed in a distributed fashion.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other embodiment.

Although embodiments have been described with reference to a number of illustrative embodiments, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal, comprising:
   a touch screen configured to display information;
   a communication unit configured to establish a communication network with an external display device; and
   a controller configured to:
   execute a specific application;
   output an execution screen of the specific application via the external display device when an output extension function is activated;
   deactivate at least one specific function of the specific application if the output extension function is activated; and
   set the touch screen to comprise one or more control regions, each of the one or more control regions corresponding to one of the deactivated at least one specific function.

2. The mobile terminal of claim 1, wherein the controller is further configured to:
   divide the touch screen into a plurality of touch regions; and
   allocate at least one of the plurality of touch regions to a control region of the one or more control regions.

3. The mobile terminal of claim 2, wherein the deactivated at least one specific function is set by a user selection of one of the plurality of touch regions.

4. The mobile terminal of claim 2, wherein the controller is further configured to divide the touch screen into the plurality of touch regions based on a moving touch pattern received via the touch screen.

5. The mobile terminal of claim 2, wherein the controller is further configured to:
   deactivate a preset function related to the specific application; and
   divide the touch screen into the plurality of touch regions based on a moving touch pattern received via the touch screen.

6. The mobile terminal of claim 5, wherein the controller is further configured to:
   set a specific function of the at least one specific function to correspond to a touch region of the plurality of touch regions based on a user selection.

7. The mobile terminal of claim 2, wherein the controller is further configured to:
   allocate at least two of the plurality of touch regions to at least two control regions of the one or more control regions; and
   allocate at least one of the plurality of touch regions between the at least two of the plurality of touch regions to a reference region distinguishing the at least two of the plurality of touch regions from each other.

8. The mobile terminal of claim 7, wherein the controller is further configured to:
   output feedback when a touch input is received via the reference region.

9. The mobile terminal of claim 1, wherein the controller is further configured to:
   control a motion of a specific object displayed on the execution screen in response to a touch input to the one or more control regions.

10. The mobile terminal of claim 1, wherein the controller is further configured to:
    cause the touch screen to display the execution screen when the output extension function is activated.

11. The mobile terminal of claim 1, wherein the controller is further configured to cause the touch screen to display the one or more control regions.

12. The mobile terminal of claim 1, wherein the controller is further configured to:
    when a previously set function is deactivated and one or more touch inputs are received via the touch screen, set one or more touch regions to correspond to the one or more control regions based on a location of the one or more touch inputs.

13. The mobile terminal of claim 1, further comprising:
    a sensing unit configured to sense motion of the mobile terminal,
    wherein the controller is further configured to:
    control the execution of the specific application based on a touch input received via the touch screen on a control region of the one or more control regions and a motion sensed via the sensing unit.

14. The mobile terminal of claim 1, wherein the controller is further configured to:
no longer output the execution screen when a first control signal is received; and
output the execution screen again when a second control signal is received such that the output is continued from a state where the output was previously stopped in response to the first control signal.

15. The mobile terminal of claim 1, wherein the controller is further configured to:
change content output to the external display device from first content to second content without interrupting a connection to the external display device when a first control signal is received.

16. A mobile terminal, comprising:
a touch screen configured to display information;
a communication unit configured to establish a communication network with an external display device; and
a controller configured to:
execute a specific application;
output an execution screen of the specific application via the external display device when an output extension function is activated;
deactivate a specific function of the specific application when the output extension function is activated; and
control the execution of the specific application using a cursor displayed in the output execution screen, wherein movement of the cursor tracks movement of a first touch input received via the touch screen.

17. The mobile terminal of claim 16, wherein the controller is further configured to:
deactivate the specific function previously set; and
set an initial position of the cursor at a predetermined position of the execution screen, wherein the cursor tracks the movement of the first touch input starting from the initial position.

18. The mobile terminal of claim 17, wherein the controller is further configured to:
perform a first function corresponding to the movement of the first touch input; and
perform a second function corresponding to a release of the first touch input from the touch screen.

19. The mobile terminal of claim 17, wherein the controller is further configured to:
perform a first function when the first touch input is dragged and released from a position on the touch screen, the first function corresponding to the position where the first touch input was released from the touch screen.

20. The mobile terminal of claim 17, wherein the controller is further configured to:
perform a second function when a second touch input is received, the second touch input occurring after the first touch input, the second function corresponding to a position where the second touch input was released from the touch screen.

21. The mobile terminal of claim 17, further comprising:
a sensing unit configured to sense motion of the mobile terminal, wherein the controller is further configured to:
control at least a moving speed of the cursor or a distance that the cursor travels based on a sensed motion of the mobile terminal.

22. The mobile terminal of claim 16, wherein the controller is further configured to:
control at least a moving speed of the cursor or a distance traveled by the cursor based on at least an area of the first touch input or a quantity of received touch inputs.

23. The mobile terminal of claim 16, wherein the controller is further configured to:
control at least a moving speed of the cursor or a distance traveled by the cursor based on whether the first touch input was received on a specific region of the touch screen.

24. The mobile terminal of claim 16, wherein the controller is further configured to:
no longer output the execution screen via the external display device when a first control signal is received; and
output the execution screen again when a second control signal is received such that the output is continued from a state where the output was previously stopped in response to the first control signal.

25. The mobile terminal of claim 16, wherein the controller is further configured to:
change content output to the external display device from first content to second content without interrupting a connection to the external display device when a first control signal is received.

* * * * *